United States Patent [19]

Langkamp et al.

[11] Patent Number: 5,792,552

[45] Date of Patent: Aug. 11, 1998

[54] REUSABLE CONCRETE FORM PANEL SHEETING

[75] Inventors: James Robert Langkamp, Glen Ellyn, Ill.; James Edwin Snarr, Sandy, Utah

[73] Assignee: Providence Industries, L.L.C., West Chicago, Ill.

[21] Appl. No.: 629,950

[22] Filed: Apr. 12, 1996

[51] Int. Cl.$^6$ .................................. B28B 7/28; B32B 3/28
[52] U.S. Cl. ........................ 428/309.9; 249/10; 249/13; 249/176; 249/177; 249/183; 249/184; 249/192; 428/53; 428/182; 428/306.6; 428/317.9; 428/908.8
[58] Field of Search .................................. 428/33, 53, 71, 428/318.6, 319.7, 319.9, 908.8, 182, 317.9, 309.9, 306.6; 249/10, 13, 115, 176, 177, 183, 184, 192

[56] References Cited

U.S. PATENT DOCUMENTS

| | | | |
|---|---|---|---|
| 2,465,319 | 3/1949 | Whinfield et al. | 260/75 |
| 2,728,702 | 12/1955 | Simon et al. | 154/83 |

(List continued on next page.)

FOREIGN PATENT DOCUMENTS

| | | |
|---|---|---|
| 2055371 A1 | 5/1992 | Canada. |
| 0 077 579 A1 | 4/1983 | European Pat. Off.. |
| 0 353 637 A1 | 2/1990 | European Pat. Off.. |
| 0 487 952 A1 | 6/1992 | European Pat. Off.. |
| 2 398 151 A1 | 2/1979 | France. |
| 2 683 574 A1 | 5/1993 | France. |
| 2 041 892 A | 3/1971 | Germany. |
| 94 15 570 U1 | 3/1995 | Germany. |
| 64-80665 | 3/1989 | Japan. |
| 1-94159 | 4/1989 | Japan. |
| 2-151429 | 6/1990 | Japan. |
| 2-151430 | 6/1990 | Japan. |

OTHER PUBLICATIONS

International Preliminary Examination Report for PCT/US96/05118 (04 Aug. 1997).

Product Literature pertaining to Modu–U–Form® Concrete Forming System, Bulletin MF–18D, Manufactured by Patent Scaffolding Co., a division of Harsco Corporation, One Bridge Plaza, Fort Lee, New Jersey, U.S.A. 07024 (1980).

Product Literature pertaining to Aluma–Systems® Walls, Stripping, Flying and Resetting, and Aluma® Ganged Wall Forms, from Aluma Systems Corp., 4810 Dufferin Street, Downsview, Ontario, Canada M3H 5S8 (1988 & 1991).

Product Literature pertaining to Gates Commercial Forming Systems, Gates & Sons, Inc. 90 South Fox Street, Denver, Colorado 80223 (Mar., 1993).

Product Literature pertaining to Gates Horizontal Rod Panel System, Gates & Sons, Inc., 90 South Fox Street, Denver, Colorado 80223 (1990).

Symons All Products Catalog, from Symons Corporation, 200 East Touhy Avenue, P.O. Box 5018, Des Plaines, Illinois 60017 (1992).

(List continued on next page.)

*Primary Examiner*—James J. Bell
*Assistant Examiner*—Blaine R. Copenheaver
*Attorney, Agent, or Firm*—Marshall, O'Toole, Gerstein, Murray & Borun

[57] ABSTRACT

The invention relates to concrete form panel sheeting comprising a resinous polymer core defining a concrete-form face and an opposite face, and a concrete-facing surface layer attached to the concrete-form face, the concrete-facing surface layer being adapted to be contacted by fresh concrete and to release from the concrete after curing thereof, to facilitate reuse of the concrete form panel sheeting. The invention further relates to concrete forms and form networks having the inventive concrete form panel sheeting as a component therein. The invention also relates to applications using the sheeting and forms to pour concrete.

48 Claims, 20 Drawing Sheets

U.S. PATENT DOCUMENTS

| | | | |
|---|---|---|---|
| 2,999,835 | 9/1961 | Goldberg | 260/42 |
| 3,028,365 | 4/1962 | Schnell et al. | 260/47 |
| 3,047,539 | 7/1962 | Pengilly | 260/75 |
| 3,153,008 | 10/1964 | Fox | 260/47 |
| 3,256,133 | 6/1966 | Wright et al. | 161/160 |
| 3,306,874 | 2/1967 | Hay | 260/47 |
| 3,306,875 | 2/1967 | Hay | 260/47 |
| 3,383,435 | 5/1968 | Cizek | 260/874 |
| 3,396,923 | 8/1968 | Windecker | 244/123 |
| 3,592,435 | 7/1971 | Mattingly | 249/1 |
| 3,595,515 | 7/1971 | Rollow | 249/134 |
| 3,654,012 | 4/1972 | Schlager | 156/212 |
| 3,788,020 | 1/1974 | Gregori | 52/309 |
| 4,078,348 | 3/1978 | Rothman | 52/309.7 |
| 4,121,008 | 10/1978 | Seddon | 428/251 |
| 4,169,180 | 9/1979 | McDonagh | 428/215 |
| 4,229,920 | 10/1980 | Lount | 52/309.12 |
| 4,283,449 | 8/1981 | Damminger | 428/72 |
| 4,333,981 | 6/1982 | Winfield et al. | 428/215 |
| 4,463,926 | 8/1984 | Bomberger | 249/47 |
| 4,576,842 | 3/1986 | Hartsing et al. | 428/35 |
| 4,577,447 | 3/1986 | Doran | 52/571 |
| 4,727,093 | 2/1988 | Allen et al. | 521/139 |
| 4,780,167 | 10/1988 | Hill | 156/245 |
| 4,835,201 | 5/1989 | Bopp | 524/102 |
| 4,849,277 | 7/1989 | Jaklofsky | 428/139 |
| 4,857,390 | 8/1989 | Allen et al. | 428/220 |
| 4,874,796 | 10/1989 | Allen et al. | 521/59 |
| 4,920,153 | 4/1990 | Allen et al. | 521/60 |
| 4,927,858 | 5/1990 | Joyce et al. | 521/59 |
| 4,968,466 | 11/1990 | Allen et al. | 264/53 |
| 4,992,482 | 2/1991 | Joyce et al. | 521/59 |
| 5,064,869 | 11/1991 | Bopp et al. | 521/60 |
| 5,087,511 | 2/1992 | Locey | 428/218 |
| 5,095,041 | 3/1992 | Bopp et al. | 521/60 |
| 5,098,059 | 3/1992 | Sawyer | 249/16 |
| 5,098,778 | 3/1992 | Minnick | 428/285 |
| 5,128,196 | 7/1992 | Luetkens, Jr. et al. | 428/213 |
| 5,130,340 | 7/1992 | Allen et al. | 521/59 |
| 5,147,710 | 9/1992 | Bopp et al. | 428/213 |
| 5,172,532 | 12/1992 | Gibbar, Jr. | 52/309.12 |
| 5,190,986 | 3/1993 | Allen et al. | 521/139 |
| 5,200,432 | 4/1993 | Bopp et al. | 521/40.5 |
| 5,215,805 | 6/1993 | Pavia, Jr. | 428/159 |
| 5,260,110 | 11/1993 | Nichols | 428/2 |
| 5,431,366 | 7/1995 | Matsumoto et al. | 249/13 |

OTHER PUBLICATIONS

Symons® Heavy Duty Shoring Application Guide, from Symons Corporation, 200 East Touhy Avenue, P.O. Box 5018, Des Plaines, Illinois 60017 (1992).

Symons Versiform® Forming System Application Guide, From Symons Corporation, 200 East Touhy Avenue, Des Plaines, Illinois 60018 (1991 & 1993).

Symons Steel–Ply® Concrete Forming System Application Guide, Symons Corporation, 200 East Touhy Avenue, P.O. Box 5018, Des Plaines, Illinois 60017 (1994 & 1988).

Product Literature pertaining to Resi–Ply™ Residential forming System from Symons Corporation, 200 East Touhy Avenue, P.O. Box 5018, Des Plaines, Illinois 60017 (1992).

Properties Module for Delrin® Acetal Resins, from Du Pont Polymers, Garret Mill Building, Barley Mill Plaza, Wilmington, DE 19880.

Product Literature pertaining Noryl PX0844, Noryl GTX909, Noryl HS1OOOX, Noryl MX5314, Noryl PX1718, Noryl PX4685, from General Electric Company Products Support, One Plastics Avenue, Pittsfield, MA 01201.

Noryl® Resin Design Guide, from GE Plastics Customer Support, General Electric Company, One Plastics Avenue, Pittsfield, MA 01201 (Mar., 1991).

Noryl® Resin Injection Molding Guide, from GE Plastics Customer Support, General Electric Company, One Plastics Avenue, Pittsfield, MA 01201 (Mar., 1994).

Noryl® Resin Properties Guide, from GE Plastics Customer Support, General Electric Company, One Plastics Avenue, Pittsfield, MA 01201 (Jun., 1993).

Product Literature pertaining to GECET™ Expandable Engineering Resins, from Huntsman Chemical Corporation, 5100 Bain Bridge Boulevard, Chesapeake, VA 23320 (1989).

Product Literature pertaining to Dytherm® Expandable Copolymers, from ARCO Chemical Company, Suite 280, 29100 Northwestern Hwy., Southfield, MI 48034.

Product Literature pertaining to CARIL™ Expandable Engineering Beads, from GE Plastics Europe, GE Plastics B.V., P.O. Box 117, 4600 AC Bergen op Zoom, The Netherlands.

"Poly(Phenylene Ether)" in Encyclopedia of Polymer Science and Engineering, vol. 13, Second Edition, John Wiley & Sons, Inc., (1988).

Azdel® Sheet Products Technical Guide, Version 6, Produced by Azdel, Inc. (date Unknown).

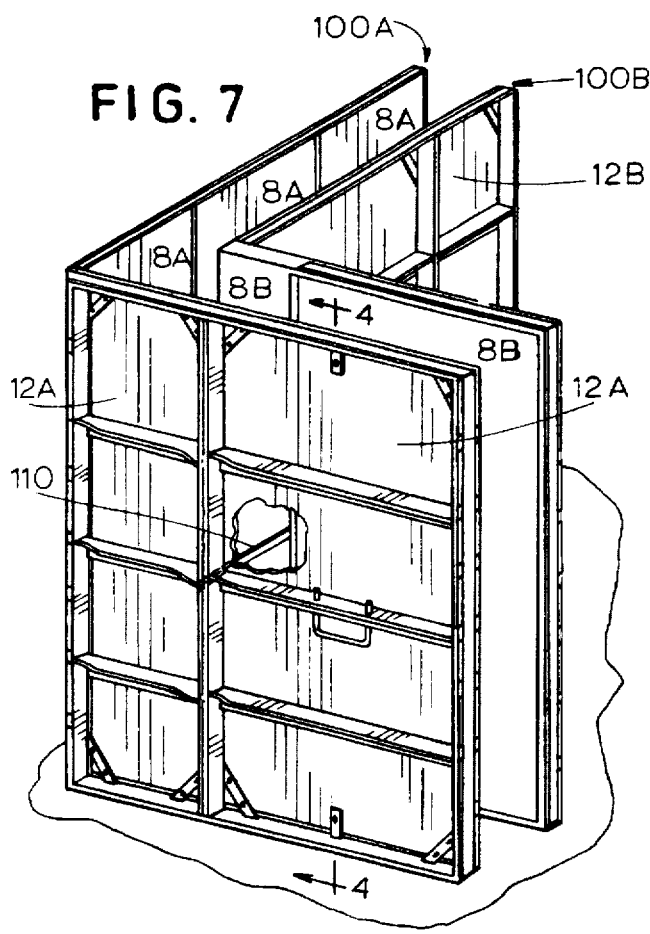
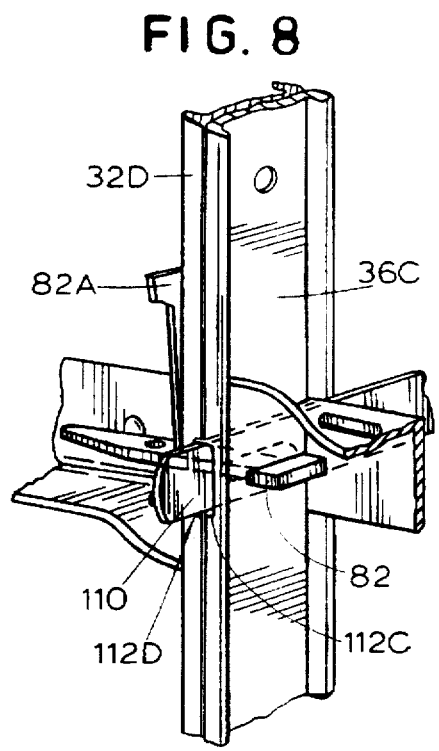
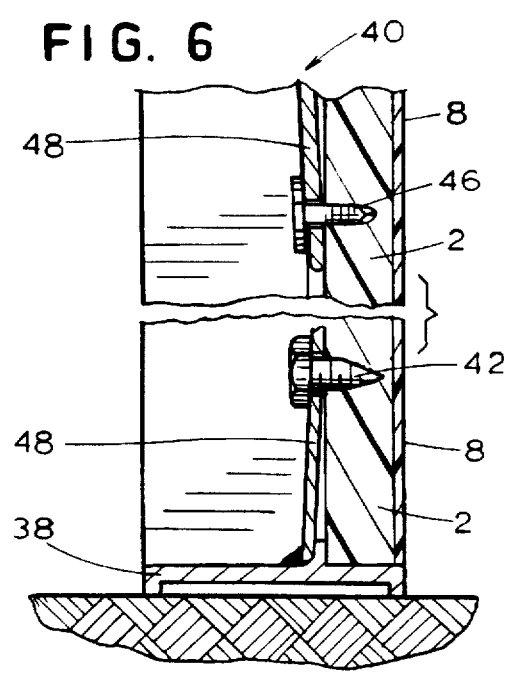
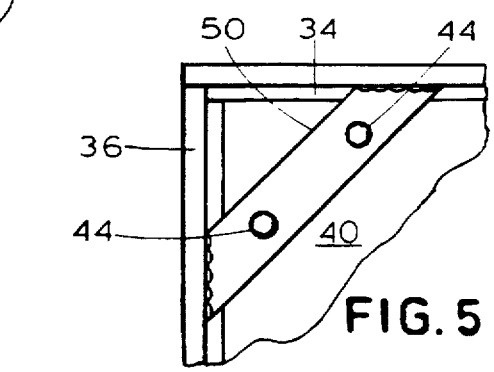
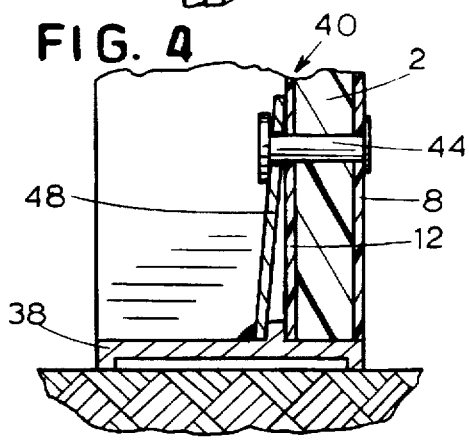

FIG. 10
FIG. 11
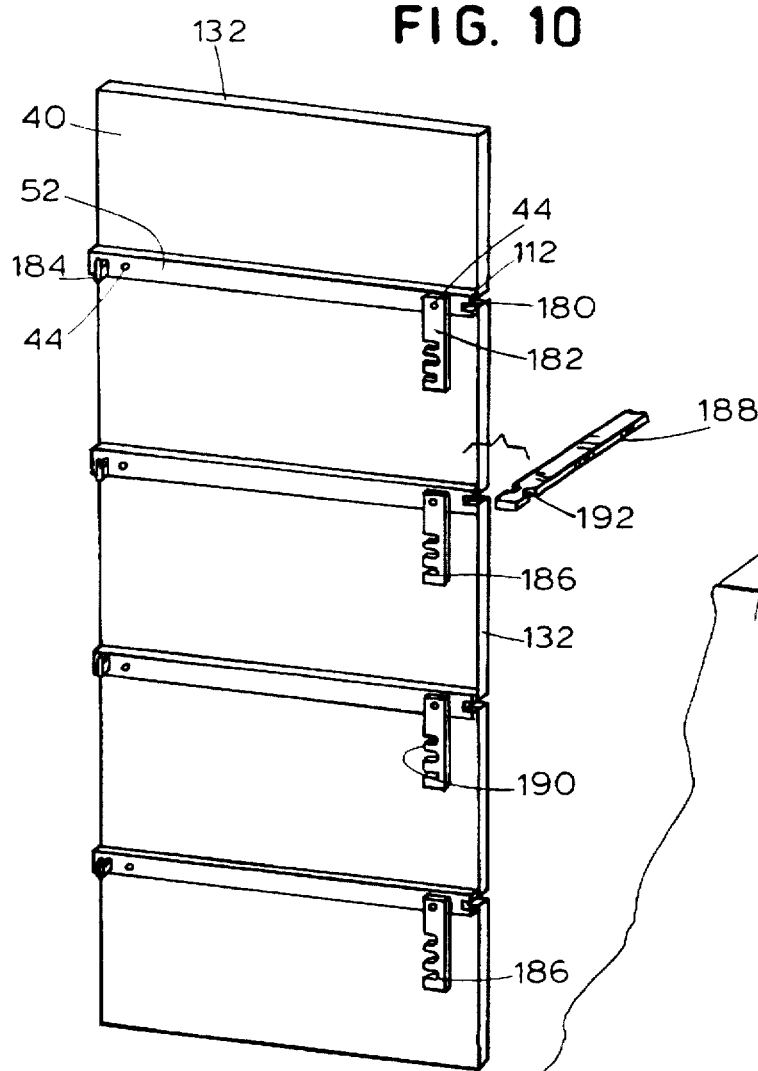
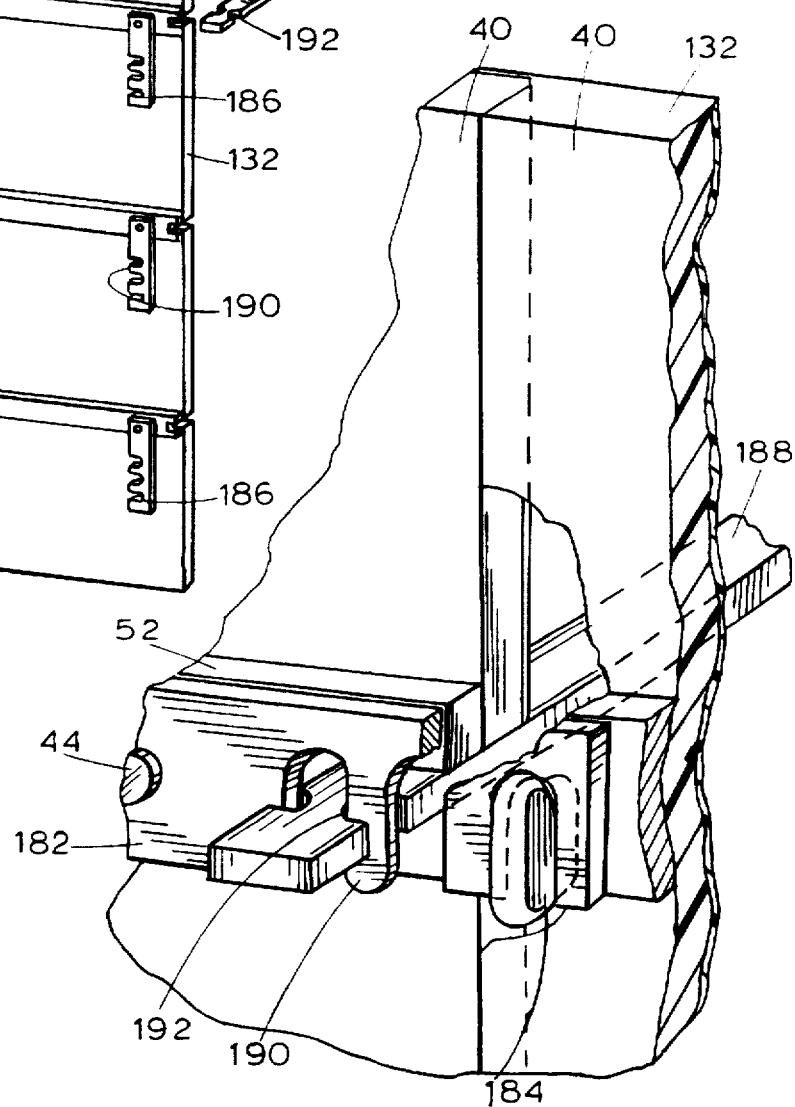

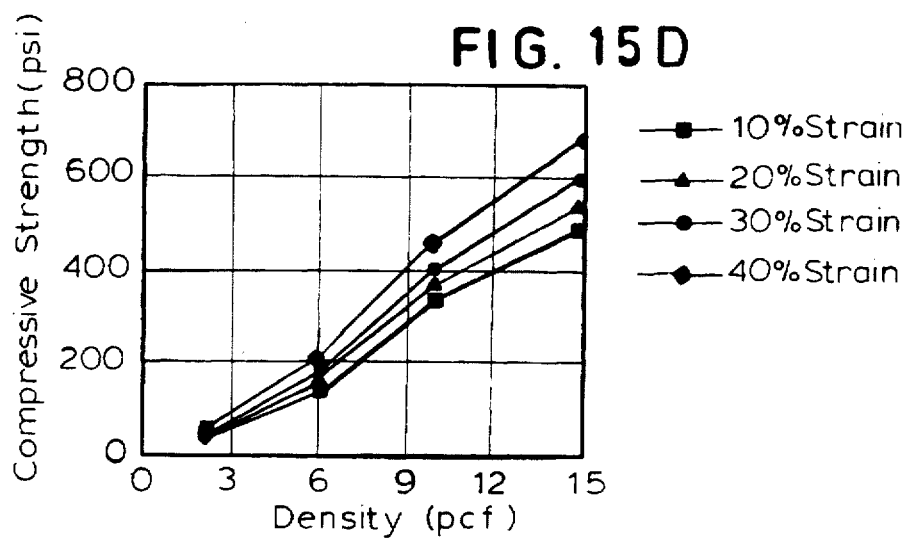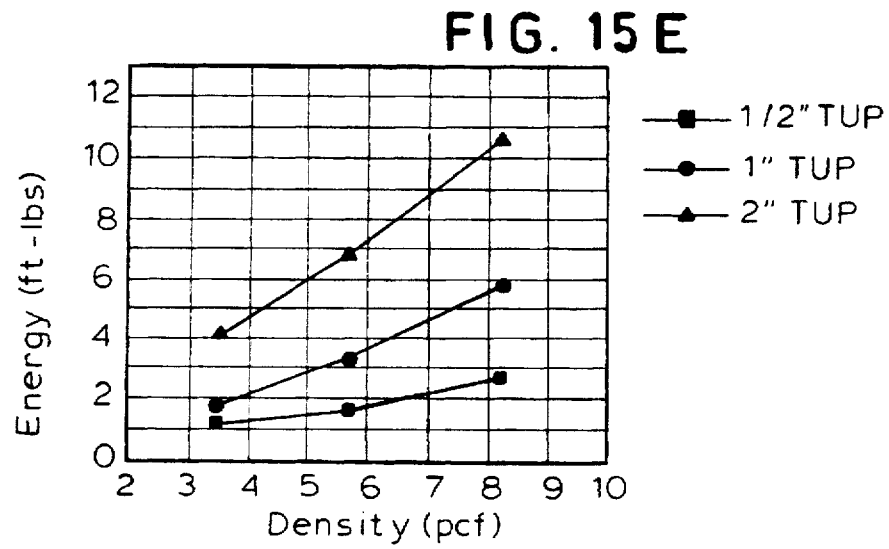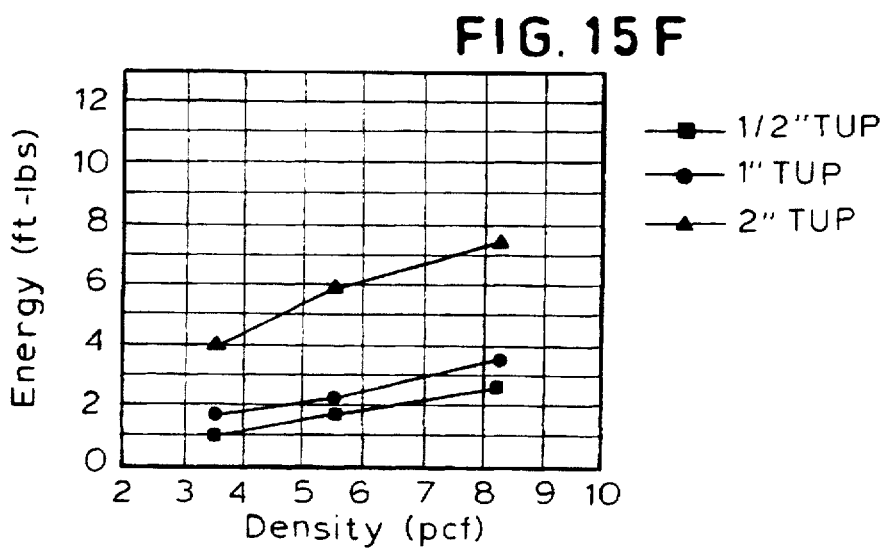

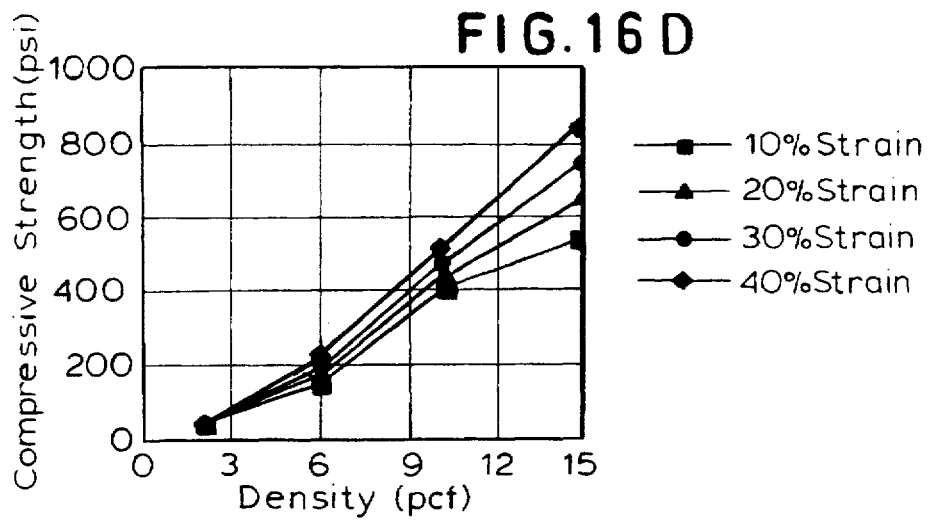
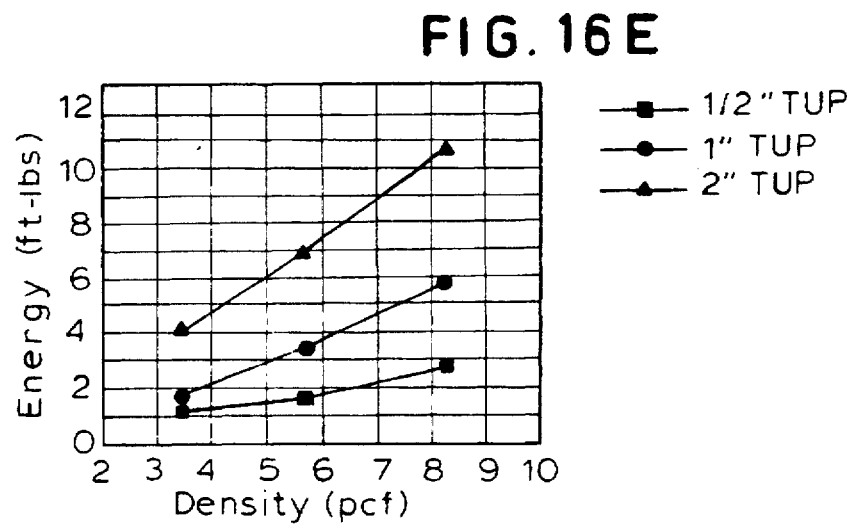
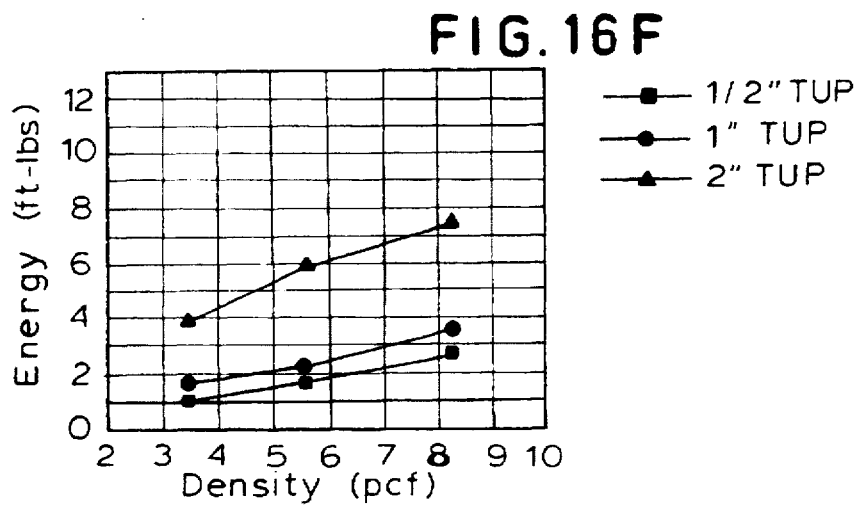

REUSABLE CONCRETE FORM PANEL SHEETING

FIELD OF THE INVENTION

This invention relates to a new structural member that is a useful substitute for plywood and other structural materials, e.g., for general construction purposes. The new structural member has particular utility as a component in concrete forms that are erected for pouring a concrete member, such as a wall, floor, ceiling, deck, or the like, which forms are subsequently removed from the concrete member after the concrete has cured.

BACKGROUND OF THE INVENTION

Removable, modular concrete forms typically comprise a rectangular plywood panel sheet, e.g., high-density overlay (HDO) Douglas Fir plywood, supported by, e.g., a steel or wooden frame on the backside face and, in some embodiments, on the circumference of the panel sheet. To create a concrete structure such as a wall, the concrete forms are temporarily assembled in a spaced, parallel relationship with inwardly-facing panel sheets, and fresh (liquid) concrete is poured in the cavity or hollow defined by the forms. The thickness of the concrete wall is established by the spacing between panel sheets, which spacing typically is maintained by wall ties. The height and length of the concrete wall is adjusted by adjacently interconnecting a plurality of forms to vary the height or length of the hollow. After the concrete has "set" or "cured," the forms are stripped away from the wall, and can be reused to create additional concrete members.

In addition to prefabricated modular concrete forms having a panel sheeting and attached frame, job-built concrete form networks and frameworks are used in the industry to construct concrete members, e.g., concrete bridges and dams. To construct a typical job-built concrete form network or framework, plywood panel sheeting, typically having no prefabricated frame, is interconnected and supported with, e.g., a lumber frame that is custom-built on-sight, to meet the particular engineering specifications of the job.

Plywood possesses a useful combination of physical properties (e.g., strength, durability, flexibility, nail retention) that make it an industry standard for use as concrete form panel sheeting. Nonetheless, plywood concrete form panel sheeting has many undesirable features and disadvantages. First, plywood is an increasingly expensive construction material made from trees, which constitute a natural resource of increasing scarcity that has been the subject of increased environmental protection in recent years. A need exists for concrete form panel sheeting made of alternative, and preferably less costly, construction materials.

Second, the excessive weight of plywood concrete form panel sheeting is burdensome. Standard building foundation concrete forms may be 2 feet×8 feet (2'×8') in size and have plywood panel sheeting that is ½ to 1 ½ inches (½"–1 ½") thick. A complete 2'×8' concrete form, with a steel frame attached to the plywood panel sheeting, typically weighs from 75 to 85 pounds. The weight of such forms makes the forms awkward and difficult for construction workers to maneuver and increases the cost of shipping such forms to and from a construction site. Therefore, a need exists for lighter concrete form panel sheeting, to use in construction of lighter concrete forms. At the same time, concrete forms typically are roughly treated (e.g., during assembly for pouring a concrete structure; stripping and disassembly; and stacking for storage and transportation). A need exists for lighter concrete forms that nonetheless are physically durable and abrasion resistant.

Conventional plywood concrete form panel sheeting requires the use of an external form release agent (e.g., form oil) which results in a further set of problems and disadvantages. More particularly, prior to pouring a concrete wall or other member, the concrete-form face (i.e., the concrete-facing face) of the plywood panel sheeting of a concrete form is oiled to prevent the plywood from adhering strongly to the concrete. Failure to oil the plywood forms results in splintering of the plywood when it is pulled from the concrete, drastically shortening the life of the concrete form. The oiling step consumes time and form oil. Thus, economic reasons create a need for oil-free concrete forms.

The oiling of concrete forms has undesirable environmental impacts, too. For example, a certain amount of the form oil that is used, e.g., when pouring a concrete building foundation, inevitably ends up on the ground. More significantly, the plywood in a concrete form panel absorbs oil during each use; a conventional 2'×8' panel can be expected to absorb about three pounds of oil during its useful life of 5–200 concrete pours. The absorbed oil softens the panel sheeting, which leads to unacceptable flexing and cracking. The oil-soaked plywood is worthless; safe disposal of this waste material is an environmental and economic concern of significant proportion, when one considers that at least about 500 million square feet of plywood concrete forms are produced annually. A long-felt need exists for reusable concrete forms which absorb less form oil, and for forms and methods for creating concrete members which permit reduced use of external form release agents, or which permit elimination of external form release agents entirely.

A long-felt need also exists for concrete form panel sheeting that will last longer than existing plywood sheeting and that can be recycled after its useful life. After about 5–200 concrete pours, plywood sheeting softens due to absorption of form oil, water, and chemicals from the liquid concrete. This absorption problem is acute at holes in the plywood, such as nail or rivet holes where the plywood sheeting has been attached to, e.g., a concrete form frame, block-outs, windows, or the like. The absorption problem often will result in the separation of laminates within the plywood or attached to the concrete-form face of the plywood. A need exists for concrete form panel sheeting that is resistant to such absorption and degradation.

Plastic-coated plywood has been used successfully as concrete form panel sheeting, and some such materials will release more easily from cured concrete than HDO plywood. However, these materials typically are heavier than HDO plywood panel sheeting, and their useful life is limited due to the inability to create a durable bond between the plastic and plywood laminates. Concrete lime destroys this bond and results in delamination, particularly at nail holes and impact holes in a panel. A need exists for concrete form panel sheeting that is resistant to such delamination.

SUMMARY OF THE INVENTION

Broadly, the present invention is directed to a structural member that is a useful substitute for plywood and other structural materials wherever such materials are employed, e.g., for constructing walls, floors, roofs, ceilings, and the like. In preferred embodiments, the structural member is recyclable without time-consuming and expensive separation of incompatible materials.

More particularly, the invention is directed to concrete form panel sheeting formed from a polymer resin. For example, the invention is directed to a concrete form panel sheeting comprising a resinous polymer core defining a concrete-form face and an opposite (backside) face, and a concrete-facing surface layer (or "face sheet") attached to the concrete-form face of the core. The concrete-facing surface layer is adapted to be contacted by fresh concrete and to release from the concrete after curing thereof, to facilitate reuse of the concrete form panel sheeting. Similarly, the invention is directed to a concrete form panel sheeting comprising a resinous polymer foam core defining a concrete-form face and an opposite face, and a concrete-facing surface layer attached to the concrete-form face of the core, the concrete-facing surface layer comprising a thermoplastic resin. In preferred embodiments, the concrete form panel sheeting further comprises a backside surface layer attached to the opposite face of the core, the backside surface layer imparting resistance to deflection to the concrete form panel sheeting. Also in preferred embodiments, the concrete form panel sheeting further comprises a stiffening means for imparting resistance to deflection to the concrete form panel sheeting, the stiffening means being integral with the resinous polymer core. To impart more resistance to deflection, the concrete form panel sheeting includes both a stiffening means and a backside surface layer. The concrete form panel sheeting of the present invention preferably answers one or more of the art-recognized needs discussed above. For example, the panel sheeting is less expensive to construct and/or less expensive over the useable life of the sheeting; is lighter; is more durable; is releasable from concrete with limited application or without application of an external form release agent; is longer-lasting; and/or is recyclable.

In a related aspect, the invention is directed to a removable concrete form comprising (1) a concrete form panel sheeting of the present invention, and (2) a concrete form frame attached to the concrete form panel sheeting. Such concrete forms preferably answer one or more of the art-recognized needs discussed above.

In another aspect, the invention relates to a concrete form network comprising a plurality of connected concrete form panel sheetings, wherein at least one of said concrete form panel sheetings is a concrete form panel sheeting of the present invention; and further comprising a support structure for maintaining the panel sheetings in a substantially fixed position when said panel sheetings are contacted by fresh concrete.

In another aspect, the invention is directed to methods for creating a concrete member. For example, the invention includes a method of creating a concrete member comprising the steps of: (a) defining a cavity for pouring fresh concrete, the cavity defined by at least one concrete form panel sheeting of the invention, the concrete form panel sheeting comprising, e.g., a resinous polymer core defining a concrete-form face and an opposite face, and a concrete-facing surface layer attached to the concrete-form face of the core, the concrete-facing surface layer being adapted to be contacted by fresh concrete and to release from the concrete after curing thereof, to facilitate reuse of the concrete form panel sheeting; (b) pouring concrete into the cavity; (c) curing the concrete to form a concrete member; and (d) separating the concrete member and the concrete form panel sheeting.

Similarly, the invention includes a method for creating a concrete member comprising: (a) interconnecting a plurality of concrete form panel sheetings to define a hollow, wherein at least one of the concrete form panel sheetings comprises a resinous polymer core defining a concrete-form face and an opposite face, and a concrete-facing surface layer attached to the concrete-form face of the core, the concrete-facing surface layer comprising a thermoplastic resin; (b) pouring concrete into the hollow; (c) curing the concrete to form a concrete member; and (d) separating the concrete member and the concrete form panel sheetings.

A related aspect of the invention is a method of creating a concrete member (e.g., a wall, a deck, or other structure) using the removable concrete forms of the present invention. More particularly, the invention is directed to a method of creating a concrete member using the novel removable concrete forms described herein, comprising the steps of: (a) interconnecting a plurality of the concrete forms, the concrete-facing surface layers of the concrete forms defining a cavity; (b) pouring concrete into the cavity; (c) curing the concrete to form a concrete member; and (d) removing the concrete forms from the concrete member.

Similarly, the invention is directed to a method of creating a horizontally disposed concrete member using the novel concrete form panel sheeting described herein, comprising the steps of: (a) interconnecting a plurality of the concrete form panel sheetings, the concrete-facing surface layers thereof defining a shoring surface; (b) pouring concrete onto the shoring surface; (c) curing the concrete to form a horizontally disposed concrete member; and (d) removing the concrete forms from the concrete member.

These and other aspects of the invention will be apparent from the following detailed description.

BRIEF DESCRIPTION OF THE DRAWINGS

FIG. 4 is a cross-sectional view of a portion of a concrete form, depicting the attachment of a frame to concrete form panel sheeting.

FIG. 5 is a view of a the corner of a concrete form.

FIG. 6 is a cross-sectional view of a portion of a concrete form, depicting an alternative attachment of a frame to concrete form panel sheeting.

FIG. 7 is a partially-elevated perspective view, partially cut away, of a concrete form network.

FIG. 8 is a perspective view of a portion of a concrete form network, depicting the connection of two adjacent concrete forms and a spacer.

FIGS. 9 and 10 are partially-elevated perspective views of rectangular concrete forms each having concrete form panel sheeting and a frame.

FIG. 11 is a perspective view of a portion of a concrete form network, partially cut away, depicting the connection of two adjacent concrete forms and a spacer.

FIG. 15D depicts compressive strength (ASTM-D1621) for varying densities of GECET® F100 resins at varying strains.

FIG. 15E depicts energy impact (in foot-pounds) at room temperature using 0.375 inch samples made from GECET® F100 resins of varying densities.

FIG. 15F depicts energy impact (in foot-pounds) after 96 hours at 248° F. using 0.375 inch samples made from GECET® F100 resins of varying densities.

DETAILED DESCRIPTION OF THE INVENTION

Figure 1:
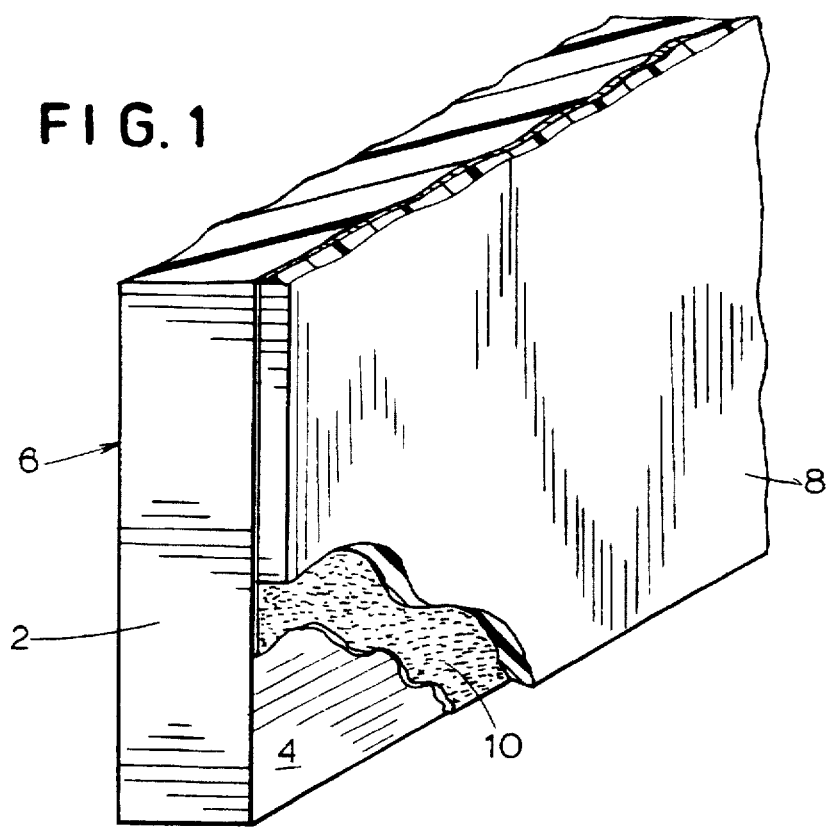
FIG. 1 is a perspective, partially elevated, partially cut away view of concrete form panel sheeting having a core and a concrete-facing surface layer adhered to the core with an adhesive.

In a basic embodiment depicted in FIG. 1, the concrete form panel sheeting of the present invention comprises (A) a resinous polymer core 2 defining a concrete-form face 4 and an opposite face 6, the core member being attached to (B) a concrete-facing surface layer (or "face sheet") 8 adapted to be contacted by uncured concrete and to release from the concrete after curing thereof. As explained more fully below, the core member may be attached to the concrete-facing surface layer by means of an adhesive layer 10, or by other suitable connection means. The core member itself may be constructed from multiple, attached layers of material.

Figure 2A:
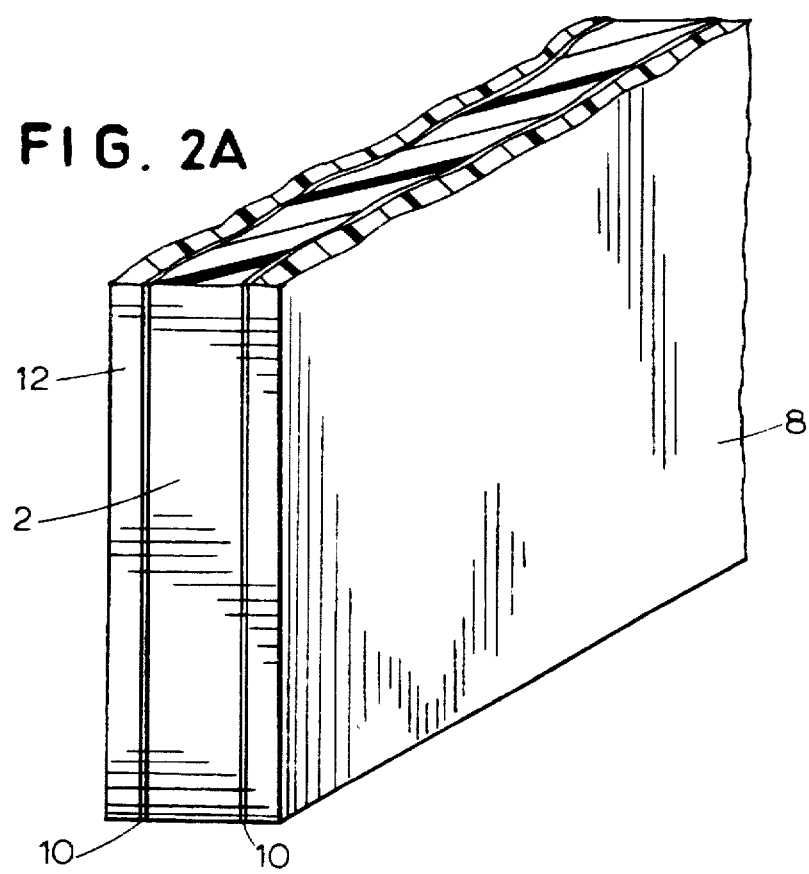
FIG. 2A is a partially-elevated perspective view, partially cut away, of concrete form panel sheeting having a core, a concrete-facing surface layer, and a backside surface layer.

In another embodiment, depicted in FIG. 2A, the opposite face of the resinous polymer core 2 is adhered to (C) a backside surface layer (or "back sheet") 12, which may be of the same or different material as the concrete-facing surface layer 8, and which also is attached to the core by an adhesive or other attachment means.

Figure 2B:
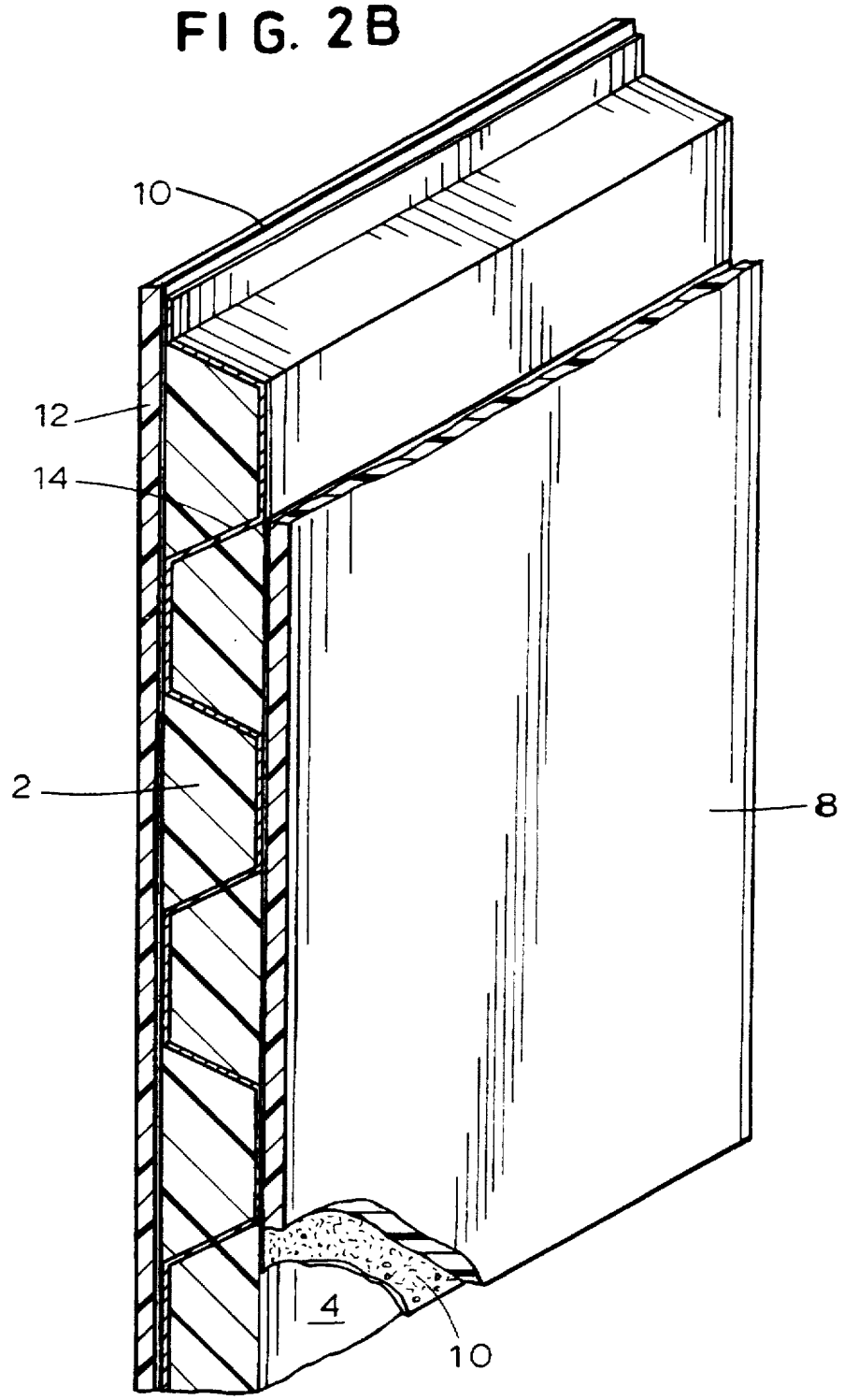
FIGS. 2B and 2C are partially-elevated perspective views, partially cut away, of two embodiments of concrete form panel sheeting having a core, a stiffener integral with the core, a concrete-facing surface layer, and a backside surface layer.
Figure 2C:
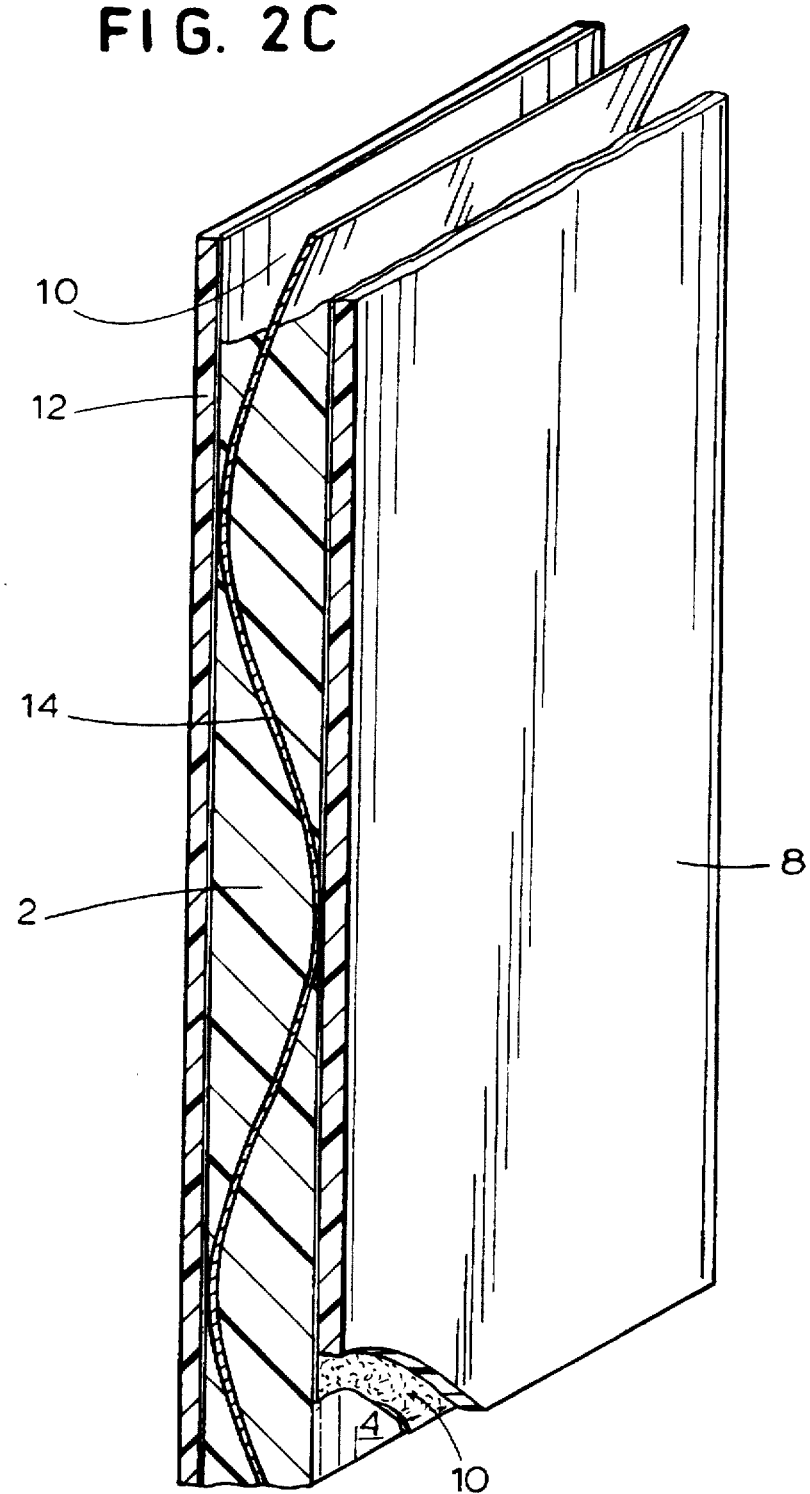
Figure 2D:
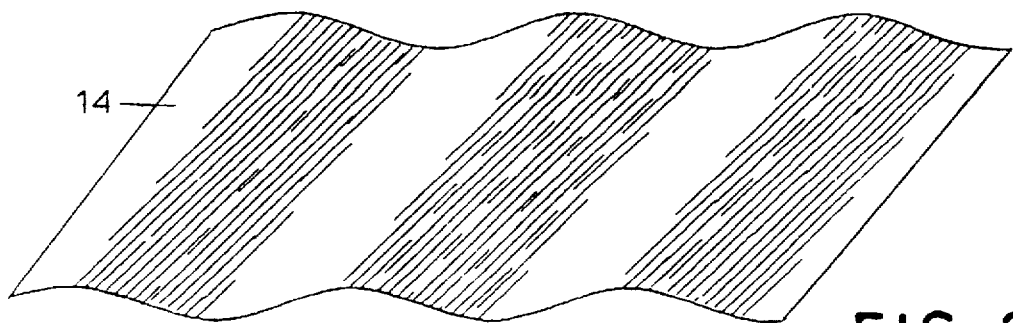
FIGS. 2D–2G are partially-elevated perspective views of corrugated stiffener members having wavy, rectangular, triangular, and trapezoidal cross-sectional geometries, respectively.
Figure 2E:
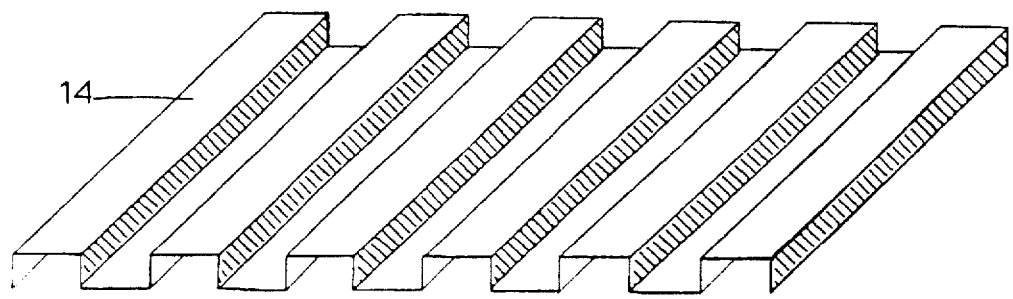
Figure 2F:
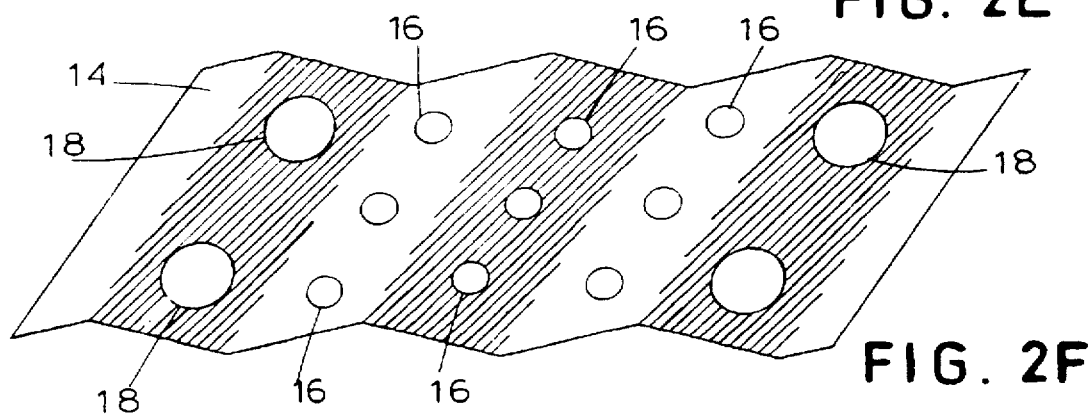
Figure 2G:
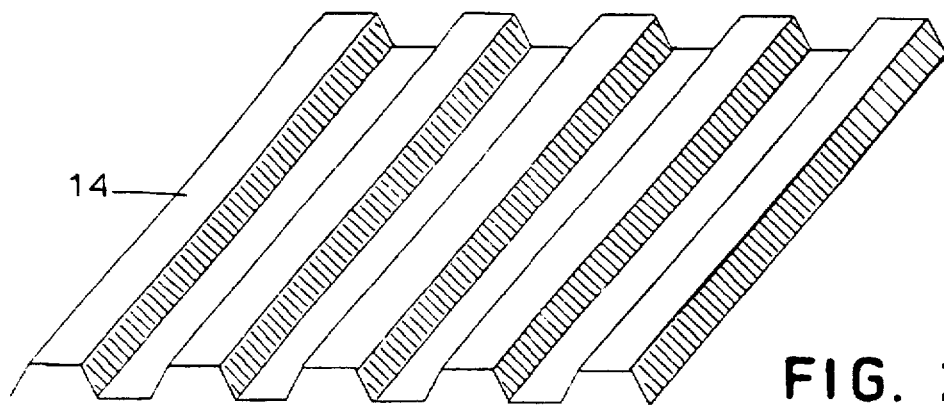

In embodiments depicted in FIGS. 2B and 2C, the concrete form panel sheeting has a resinous polymer core 2 attached to a concrete-facing surface layer 8 and a backside surface layer 12, which may be of the same or different material as the concrete-facing surface layer 8. The (A) core further comprises an integral stiffener 14, the stiffener imparting resistance to deflection to the concrete form panel sheeting. In a preferred embodiment, the stiffener has substantially identical length and width dimensions as the core, the concrete-facing surface layer, and the backside surface layer. As depicted in FIGS. 2B and 2C, the stiffener preferably has a cross-sectional geometry that extends from the concrete-form face to the opposite face of the core, i.e., extends substantially entirely through the core. Exemplary wavy, rectangular, triangular, and trapezoidal stiffener geometries are depicted in FIGS. 2D, 2E, 2F, and 2G, respectively. Stiffeners having corrugated geometries, such as those depicted in FIGS. 2D–2G, provide increased resistance to deflection compared to a substantially planar stiffener. Corrugations in multiple directions (e.g., a waffle-shaped geometry) also are contemplated for stiffener members. To facilitate manufacture of a resinous polymer core comprising an integral stiffener, the stiffener is manufactured having holes 16 as depicted in FIG. 2F. In an injection molding manufacturing process, for example, injected polymer is capable of passing through the holes to allow for the formation of a core member having an integral stiffener.

The panel sheeting of the present invention is a useful substitute for plywood and other structural materials wherever such materials are employed, e.g., for wall, floors, roofs, ceilings, and the like. In particular, the concrete form panel sheeting of the present invention is useful for constructing prefabricated, modular concrete forms; for constructing custom "job-built" concrete form networks and frameworks; for shoring applications; and for other concrete forming applications in which reusable concrete form panel sheeting may be employed. A number of exemplary embodiments for employing the inventive panel sheeting are depicted in FIGS. 3–14, as described below.

The invention is also embodied in a removable concrete form comprising (D) a concrete form support frame structure attached to the basic embodiment |(A)+(B)| and/or the embodiment |(A)+(B)+(C)| of the novel concrete form panel sheeting. The support frame imparts rigidity to the panel sheeting, protects edges and corners of the panel sheeting from damage, provides support and strength to the panel sheeting such that it can withstand increased pressure from fresh (liquid) concrete, and/or provides attachment structure for interconnecting the concrete form to additional concrete forms.

Figure 3:
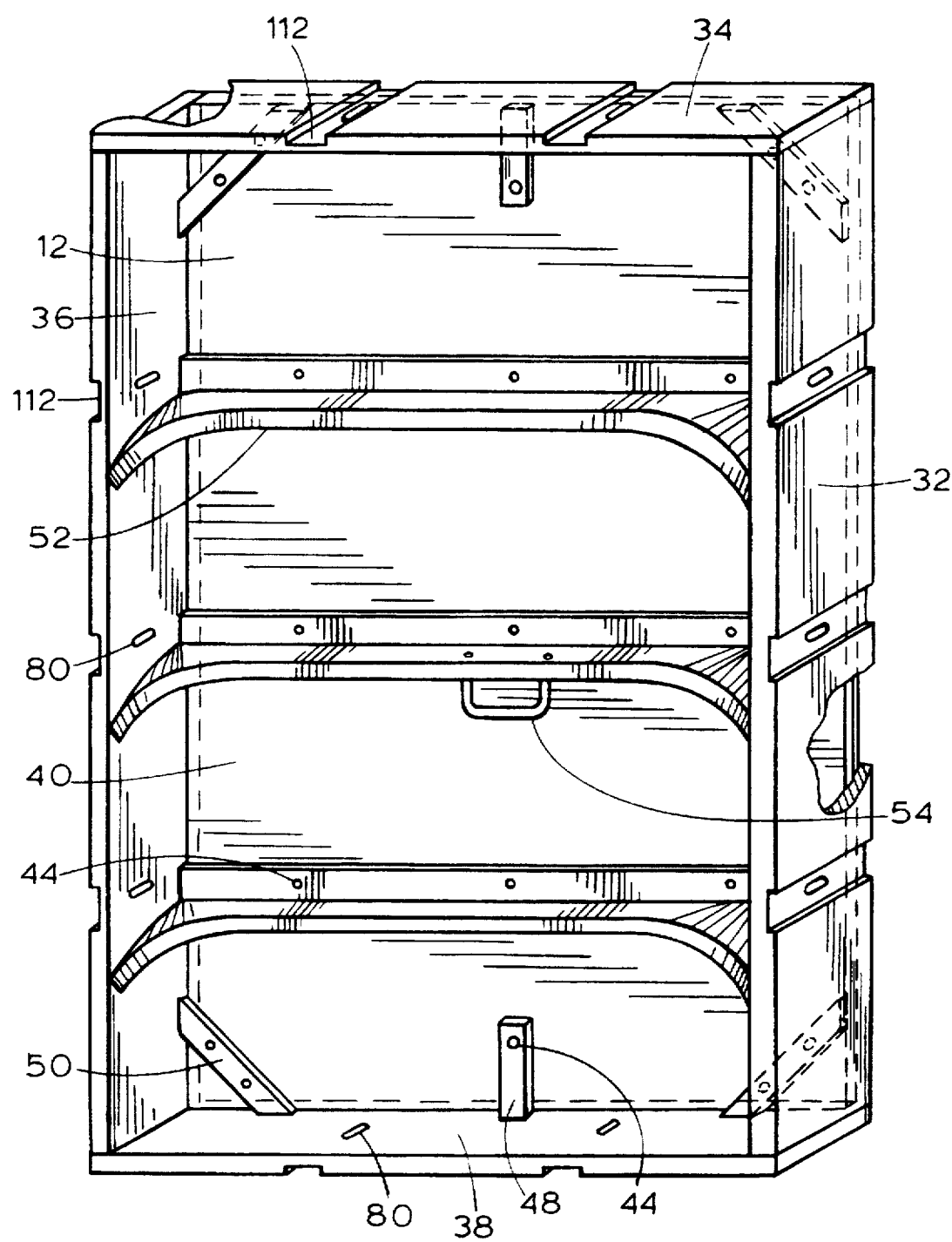
FIG. 3 is a partially-elevated, partially cut away perspective view of a rectangular concrete form having concrete form panel sheeting and a frame.
Figure 9:
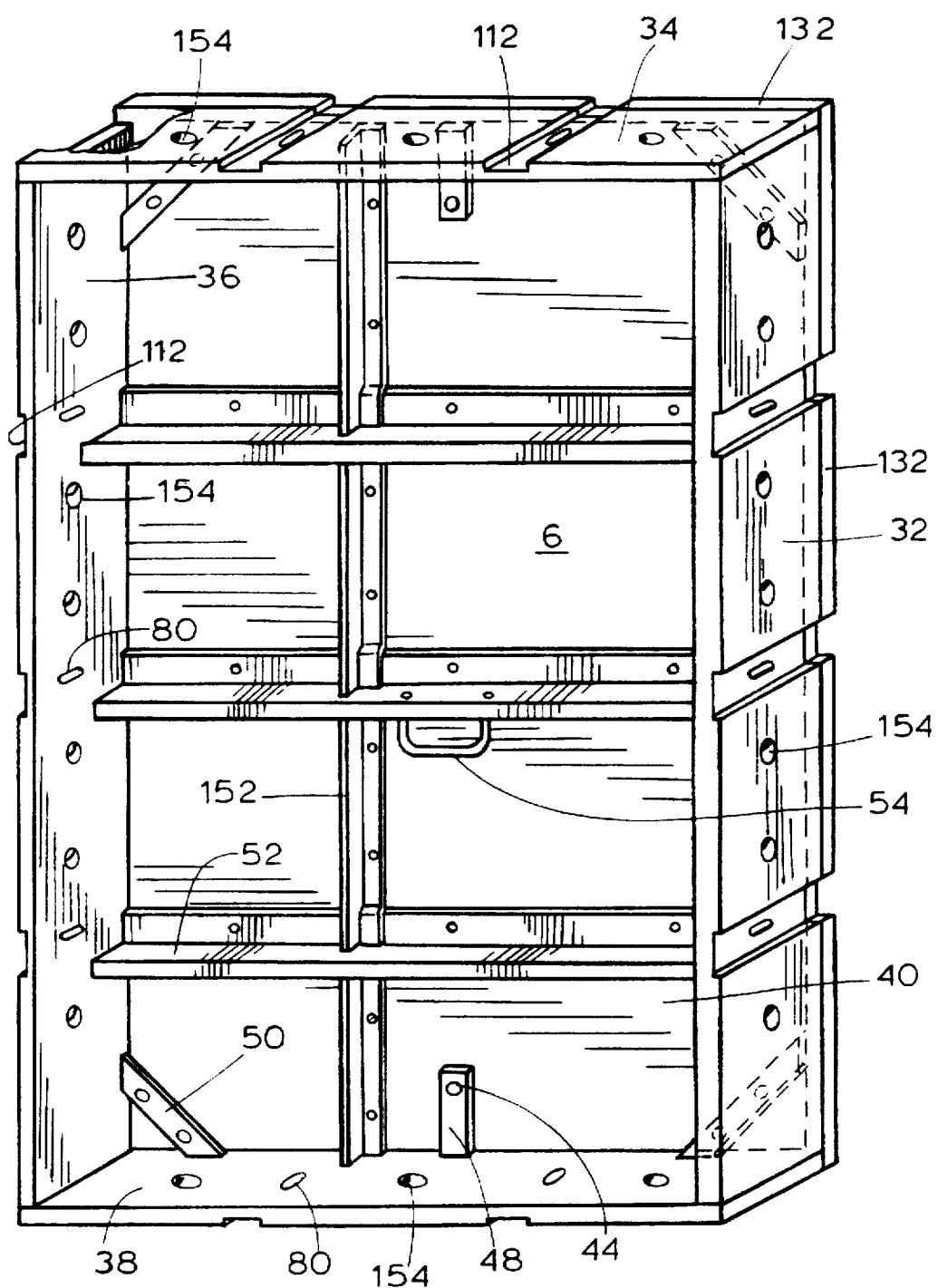

In the concrete form depicted in FIG. 3, the concrete form frame includes edge members 32, 34, 36, and 38 that surround the circumference of the panel sheeting 40 to protect the edges and corners of the panel sheeting from damage and to provide structure for attachment to additional concrete forms. As shown in FIGS. 3–6, such edge members are attached to the panel sheeting 40 by means of a screw 42, rivet 44, nail 46, or like member. Referring to FIGS. 3 and 6, the rivet 44 extends through the concrete-facing surface layer 8, the core 2, the backside surface layer 12, and through an attachment flange 48 that is attached to or integral with the frame edge member 38 and that is adjacent to the backside of the panel sheeting 40. Adjacent edge members themselves are attached to or integral with each other, e.g., by screws, solder, or weld. To provide additional support for the concrete form panel sheeting, adjacent edge members may be joined by corner supports 50, and opposite edge members may be joined by one or more cross-supports 52. For ease in handling, such frames may be provided with one or more handles 54. Such a frame may be manufactured from a metal such as steel or aluminum; alternative materials will be apparent to those in the art.

Referring to FIGS. 3, 7, and 8, a concrete form network for pouring a wall or other concrete member of a desired height and width is constructed by interconnecting a plurality of concrete forms, end to end. Thus, edge members 32, 34, 36, and 38 are formed having one or more apertures 80. Two forms are connected by inserting connecting hardware 82 through the aligned apertures 80 of the forms and securing the connecting hardware 82 with additional connecting hardware 82A. Connecting hardware as depicted herein permits construction workers to quickly join adjacent forms for pouring concrete, and subsequently disassemble such forms quickly after the concrete has cured.

The thickness of a concrete member is determined by the distance between the oppositely-oriented concrete-facing surfaces 8A and 8B of concrete form networks 100A and 100B that have been assembled as described above. This distance is maintained, and the oppositely-oriented form networks are attached, using spacers (or "ties") 110 oriented perpendicular to the panel sheetings of the networks and attached to the edge members 32, 34, 36, and/or 38 of forms that comprise each network. More particularly, the edge members have one or more recesses 112, and the recesses of the abutting edge members of two adjacent concrete forms in a network define a channel through which a spacer 110 is placed. To secure a spacer to a form network (FIG. 8), connecting hardware 82 is passed first through an aperture in the recessed portion 112C of the edge member 36C of a first concrete form in the network, then through an aperture in the spacer 110, then through an aperture in the recessed portion 112D of the edge member 32D of an abutting concrete form in the network. The connecting hardware is in turn secured with additional connecting hardware 82A. By securing each spacer to two oppositely-oriented form networks 100A and 100B in the manner described, a secure concrete form framework is provided, defining a hollow or cavity or void for pouring concrete, to form a concrete member.

Numerous variations of the modular concrete form depicted in FIG. 3 are known in the art, and can be fitted with concrete form panel sheeting of the present invention. For example, in an embodiment depicted in FIG. 9, frame edge members 32, 34, 36, and 38 are attached to the backside face 6 (or the backside surface layer, if employed) of the panel sheeting 40, and the edges 132 of the panel sheeting are exposed. When such forms are interconnected to form a concrete form network, the panel sheeting edges 132 of adjacent forms fit flush against each other, with no interruption by frame edge members. The concrete form depicted in FIG. 9 has, in addition to cross-supports 52, perpendicular cross-supports 152. Apertures 154 in the edge members 32, 34, 36 and 38 facilitate connection of adjacent forms in a network (e.g., using a nut and bolt).

FIG. 10 depicts a concrete form having a frame with no edge members. Cross-supports 52 are attached to the backside of the panel sheeting 40 by means of rivets 44. The construction of a concrete form network with a plurality of the forms is facilitated by recesses 180 in the concrete form panel sheeting, corresponding recesses 112 in the cross-support frame members, pivoting attachment hardware 182, and flanges 184. As depicted in FIGS. 10 and 11, adjacent concrete forms are connected by pivoting the attachment hardware 182 around the rivet 44 such that the attachment hardware recess 186 interlocks with the flange 184 on an adjacent concrete form. Two oppositely-oriented concrete form networks are attached with spacers 188 passed through the recesses 180 and 112 in the concrete form panel sheeting and cross-supports. The spacers are secured to the form network by passing attachment hardware flange 190 through a recess 192 in the spacer.

Figure 12:
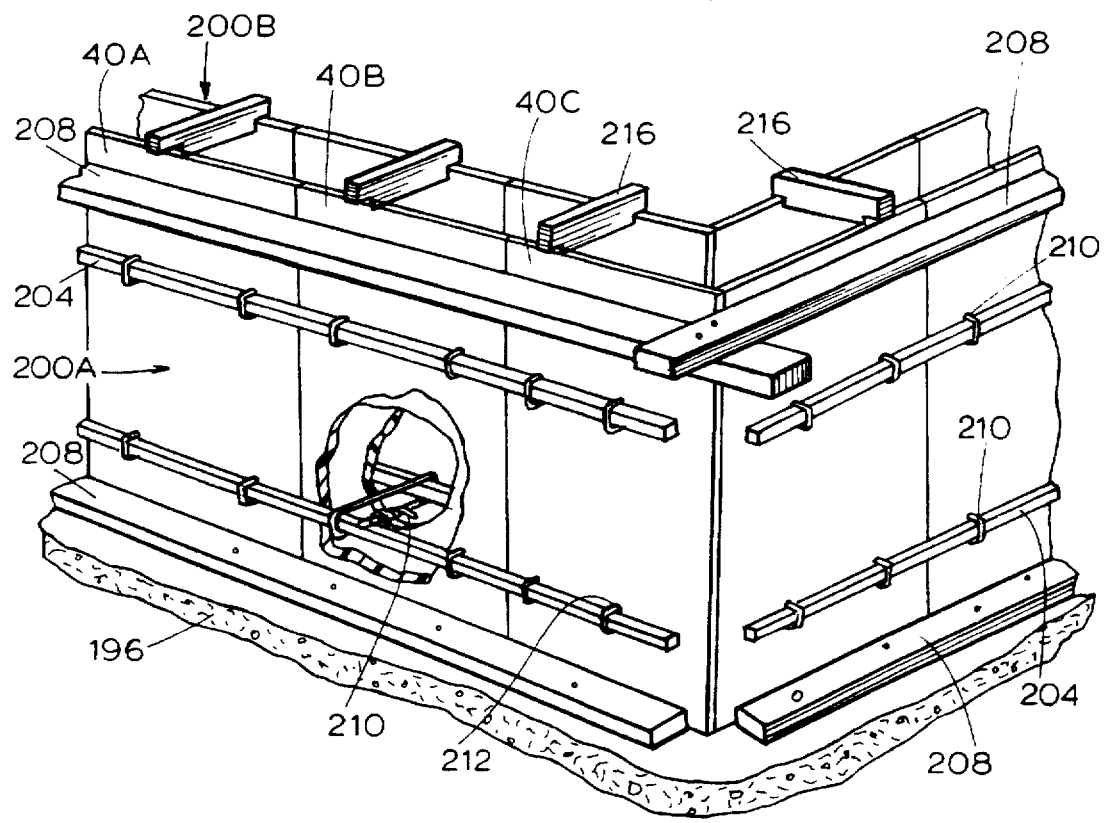
FIGS. 12 and 13 are partially-elevated perspective views, partially cut away, of concrete form networks.

One may also construct concrete form networks and frameworks without modular concrete forms, using the concrete form panel sheeting of the present invention. For example, FIG. 12 depicts a concrete form framework, comprising two concrete form networks, erected atop a cement footing 196. Adjacent concrete form panel sheets 40A, 40B, and 40C are interconnected with rods 204 and further secured with waler beams 208 constructed of, e.g., aluminum or lumber. Spacers 210 pass through apertures 212 in the panel sheeting. The rods 204, in turn, pass through apertures defined by the spacers. Thus, the rods and spacers cooperate to prevent opposite form networks 200A and 200B from separating when liquid concrete is poured into the hollow defined by the concrete form framework, but the rods themselves are not physically attached to the panel sheeting with, e.g., a nail, screw, rivet, or the like. Additional top spacers 216 cooperate with the rods, walers, and spacers 210 to maintain the fixed positions of the opposite form networks that comprise the concrete form framework.

Figure 13:
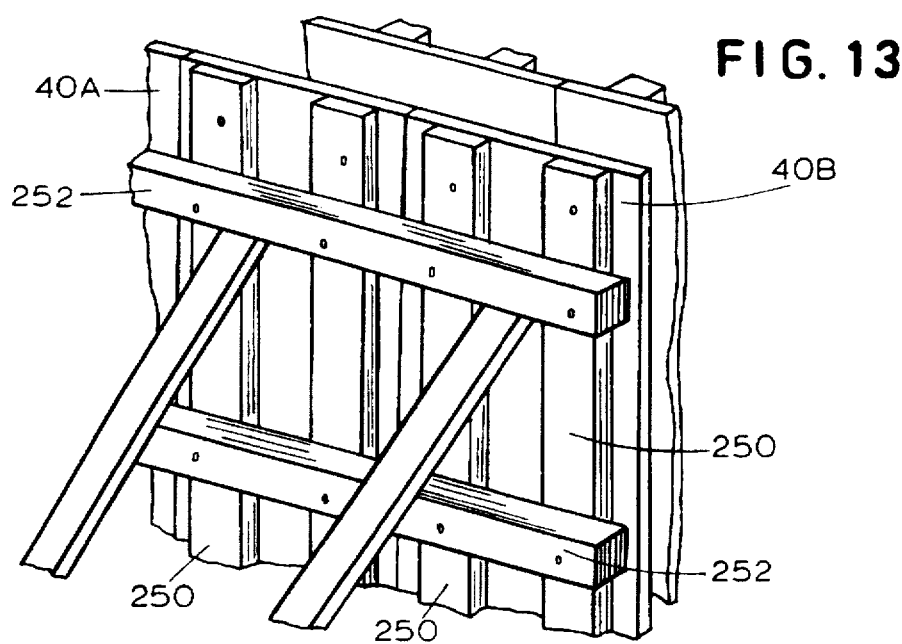

Additionally, the concrete form panel sheeting of the present invention has excellent utility as a plywood substitute in the construction of custom "job-built" concrete form networks and frameworks. As depicted in FIG. 13, the panel sheeting 40A and 40B in job-built networks and frameworks is interconnected using metal bars (e.g., steel or aluminum bars), wooden beam supports, or the like. The supports 250 are attached to the panel sheeting to maintain the sheeting in a fixed position and to provide load-bearing support, and connected to each other with additional supports 252 to erect concrete form networks and frameworks of any desired size or shape. Job-built concrete form networks and frameworks are well-known in the art, e.g., for the construction of bridges and dams, and may be connected to prefabricated concrete forms if desired. The lighter concrete form panel sheeting preferred for the present invention is particularly advantageous, compared to plywood, in many job-built applications because relatively thick (e.g., 1.125 inches or more) sheeting is often employed in such applications, and because such panel sheeting is manipulated without attached frame structures during assembly and disassembly of the concrete form networks and frameworks.

Typically, plywood concrete form panel sheeting is planar and rectangular in shape, e.g., 2'×8' in dimension. This size and shape has proven useful for pouring, e.g., concrete walls having essentially planar surfaces, and this is a preferred shape and dimension for the concrete form panel sheeting and concrete forms of the present invention. Nonetheless, from the description herein it will be apparent that the concrete form panel sheeting of the present invention can be made to have essentially any desired shape and dimension, and a steel or other frame can readily be constructed to match any shape of panel sheeting that is constructed. Frame adapters can be constructed to attach adjacent frames at preselected angles.

Figure 14:
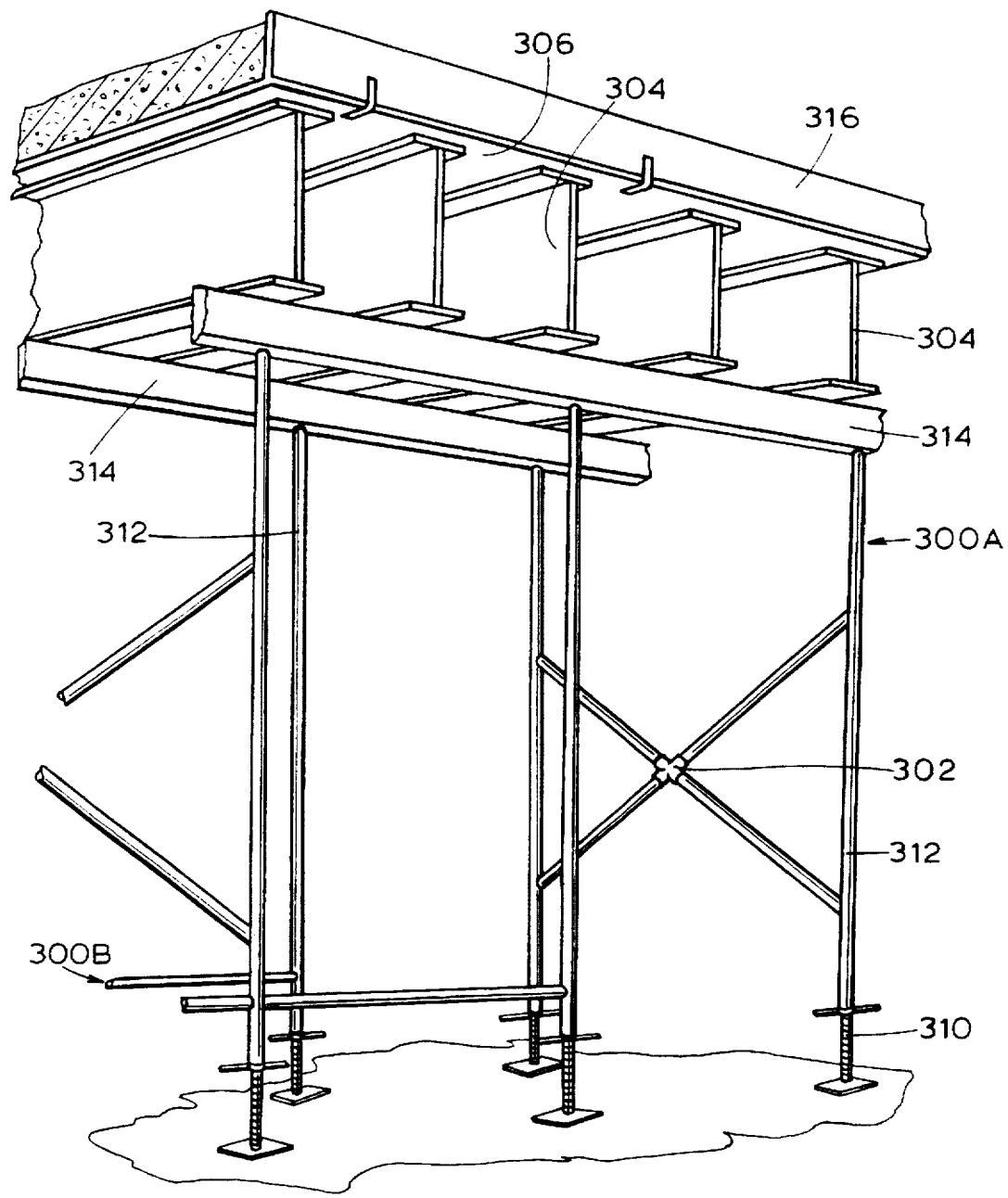
FIG. 14 is a perspective view, partially cut away, of a shoring concrete form network.
Figure 15A:
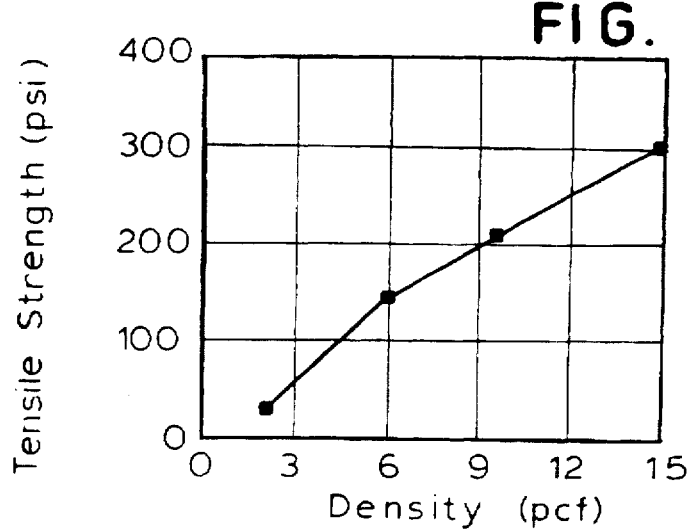
FIG. 15A depicts tensile strength (ASTM-D1623) in pounds per square inch (psi) for varying densities, in pounds per cubic foot (pcf), of GECET® F100 resins.
Figure 15B:
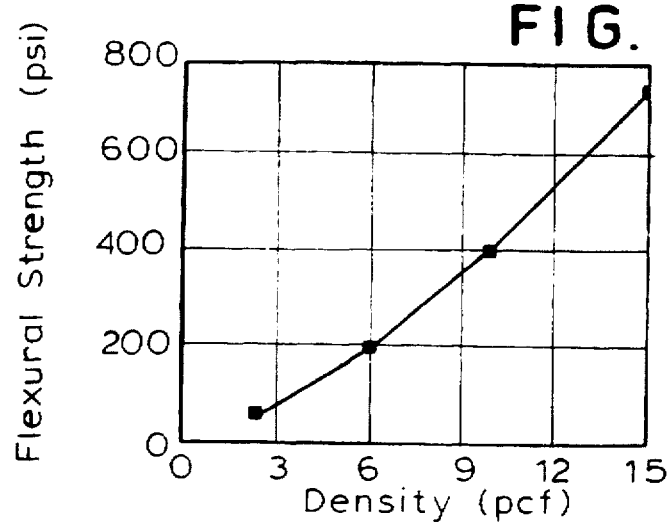
FIG. 15B depicts flexural strength (ASTM-C203) for varying densities of GECET® F100 resins.
Figure 15C:
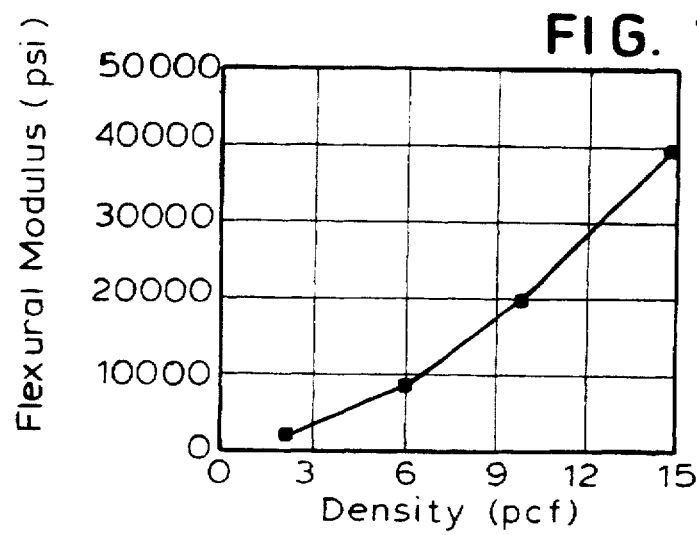
FIG. 15C depicts flexural modulus for varying densities of GECET® F100 resins.
Figure 15G:
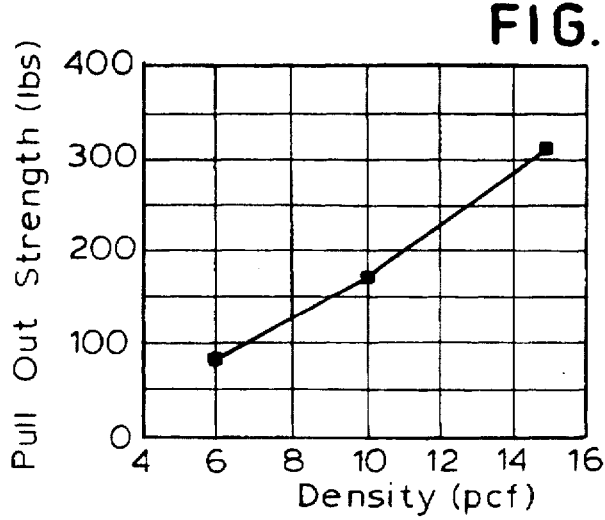
FIGS. 15G–15I depict the fastener retention properties of GECET® F100 resins. Force (in pounds) required to remove dry wall screws (FIG. 15G), finishing nails (FIG. 15H), and galvanized roof nails (15I) from GECET® F100 resin at different densities is depicted.
Figure 15H:
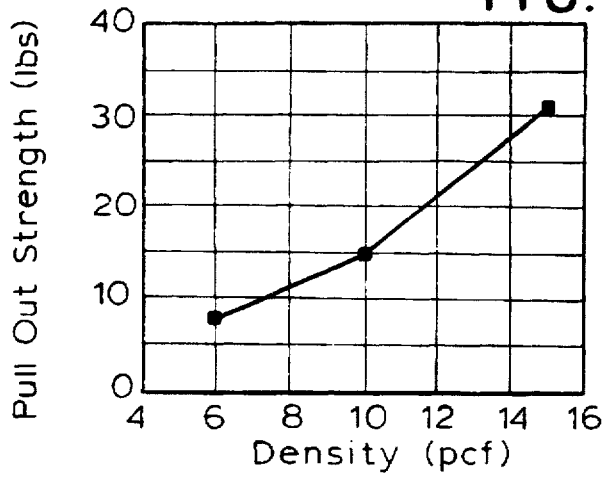
Figure 15I:
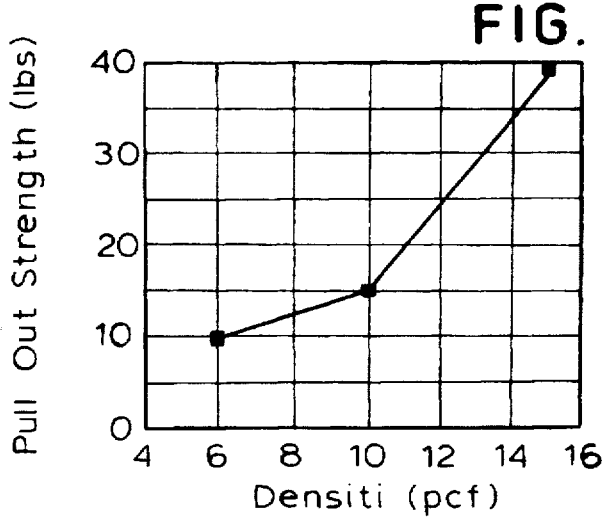
Figure 16A:
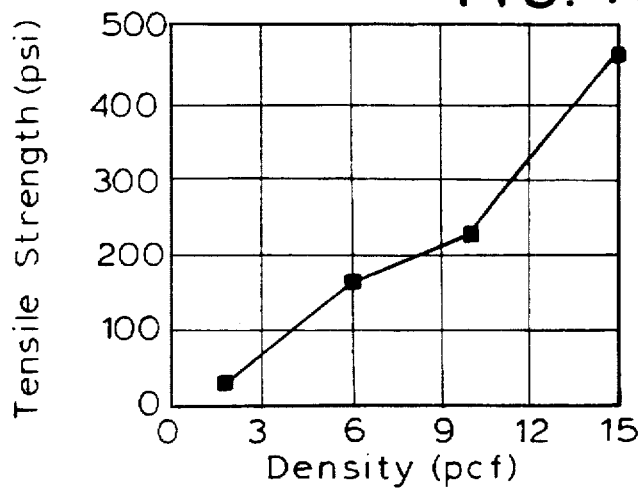
FIG. 16A depicts tensile strength (ASTM-D1623) for varying densities of GECET® F200 resins.
Figure 16B:
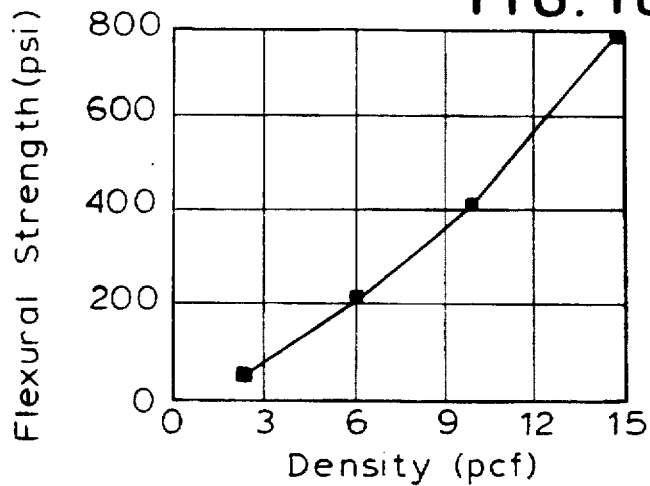
FIG. 16B depicts flexural strength (ASTM-C203) for varying densities of GECET® F200 resins.
Figure 16C:
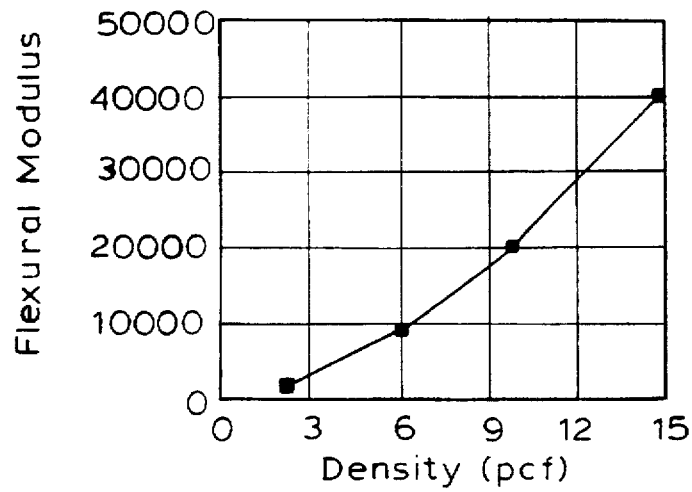
FIG. 16C depicts flexural modulus for varying densities of GECET® F200 resins.
Figure 16:
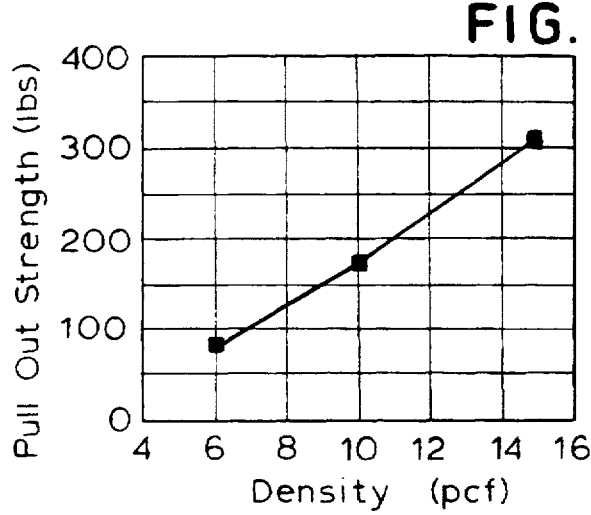
FIG. 16D depicts compressive strength (ASTM-D1621) for varying densities of GECET® F200 resins at varying strains.
FIG. 16E depicts energy impact (in foot-pounds) at room temperature using 0.375 inch samples made from GECET® F200 resins of varying densities.
FIG. 16F depicts energy impact (in foot-pounds) after 96 hours at 248° F. using 0.375 inch samples made from GECET® F200 resins of varying densities.
FIGS. 16G–16I depict the fastener retention properties of GECET® F200 resins. Force (in pounds) required to remove dry wall screws (FIG. 16G), finishing nails (FIG. 16H), and galvanized roof nails (16I) from GECET® F200 resin at different densities is depicted.
Figure 16:
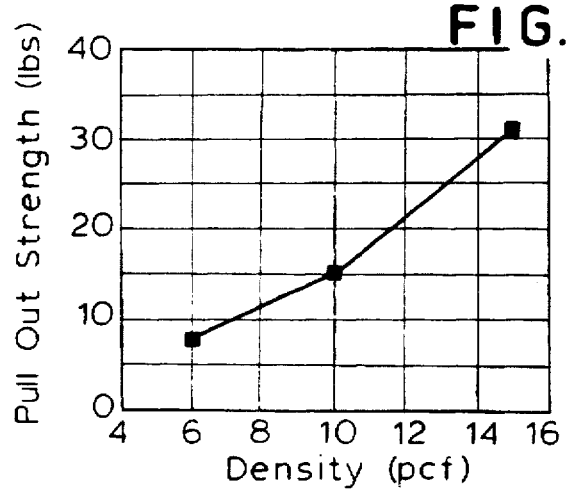
Figure 16:
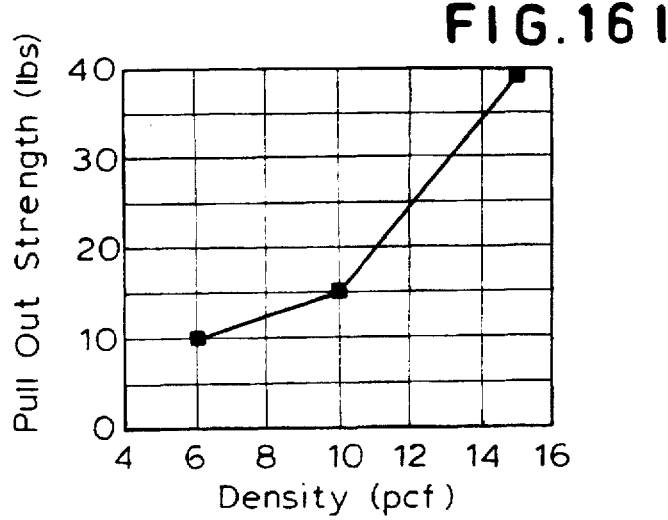
Figure 17A:
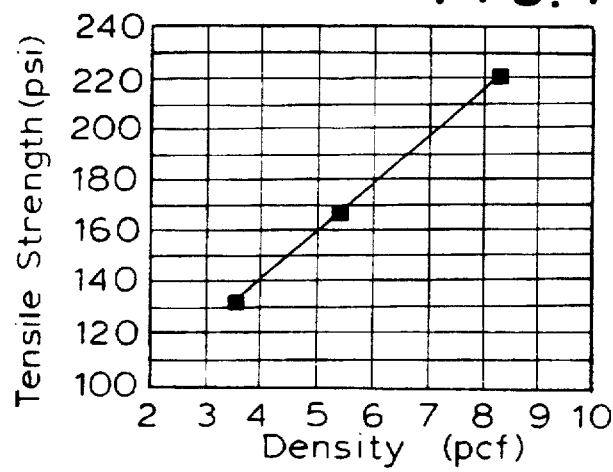
FIG. 17A depicts tensile strength (ASTM-D1623) for varying densities of GECET® F300 resins.
Figure 17B:
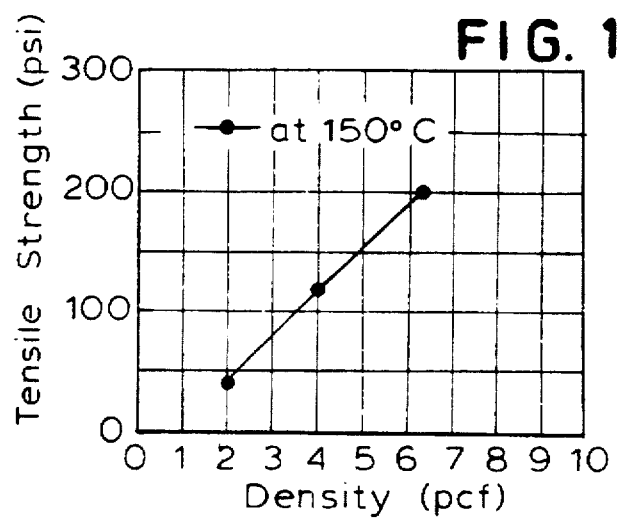
FIG. 17B depicts tensile strength at break in psi for varying densities of GECET® F300 resins.
Figure 17C:
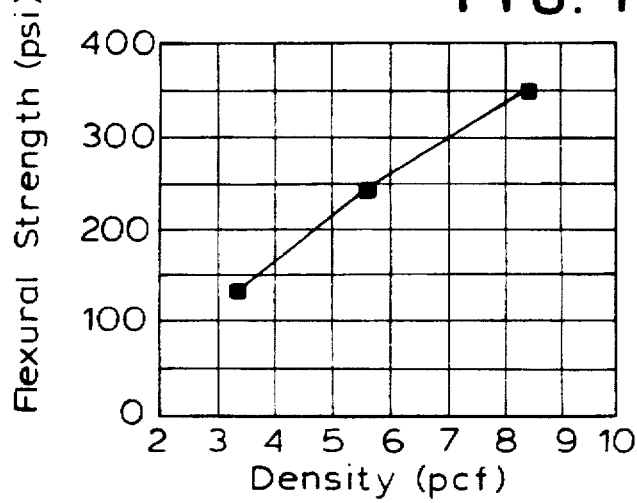
FIG. 17C depicts flexural strength (ASTM-C203) for varying densities of GECET® F300 resins.
Figure 17D:
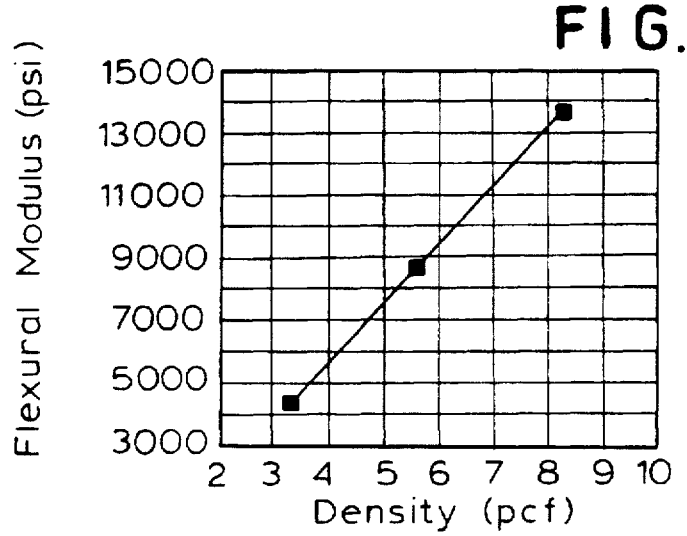
FIG. 17D depicts flexural modulus for varying densities of GECET® F300 resins.
Figure 17E:
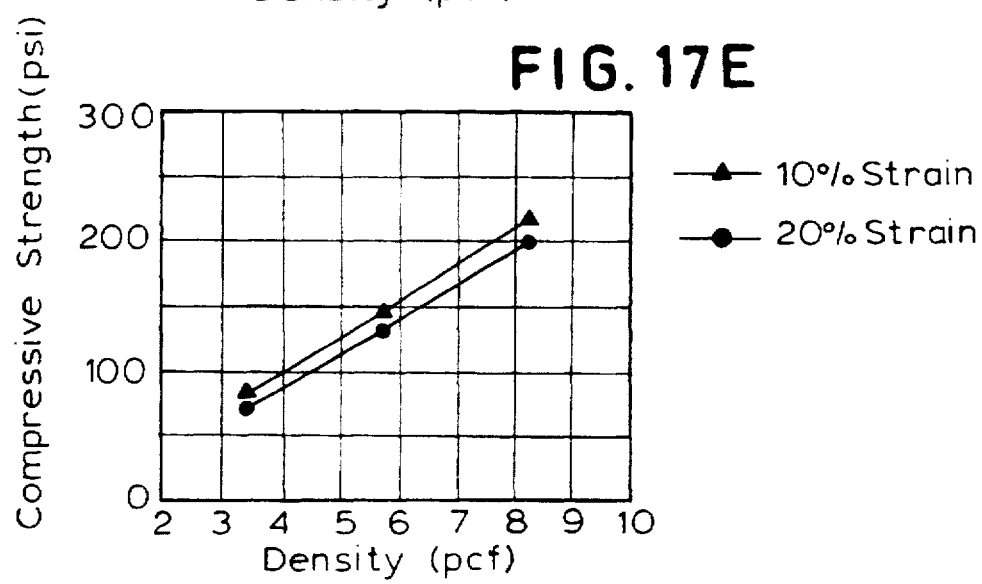
FIG. 17E depicts compressive strength (ASTM-D1621) for varying densities of GECET® F300 resins at varying strains.
Figure 17F:
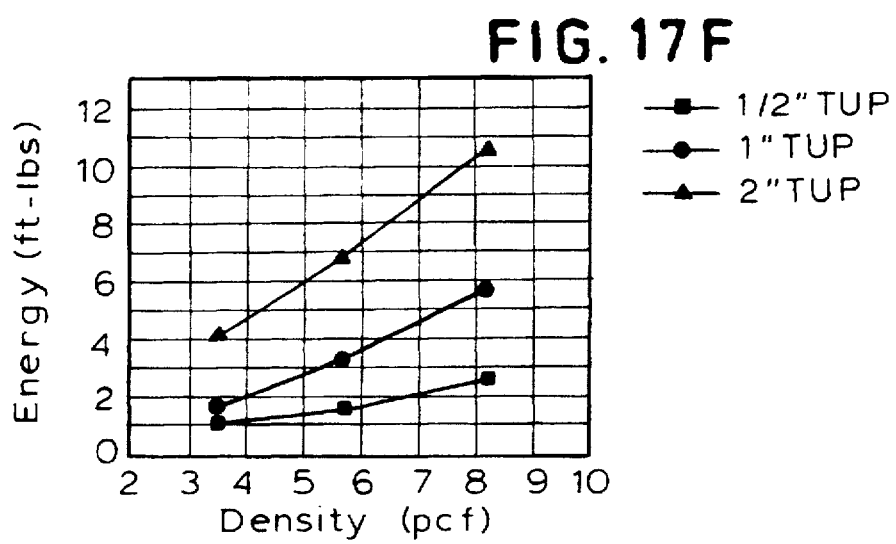
FIG. 17F depicts energy impact (in foot-pounds) at room temperature using 0.375 inch samples made from GECET® F300 resins of varying densities.
Figure 17G:
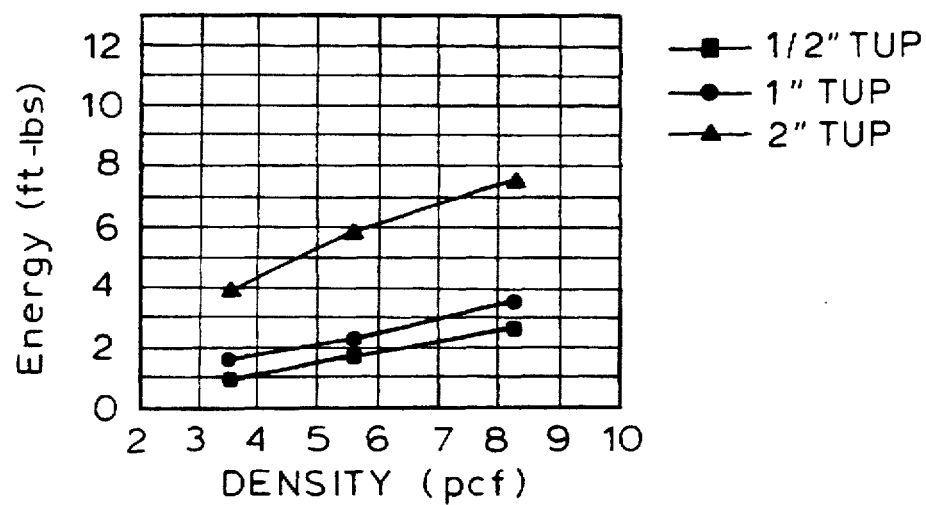
FIG. 17G depicts energy impact (in foot-pounds) after 96 hours at 248° F. using 0.375 inch samples made from GECET® F300 resins of varying densities.
Figure 17H:
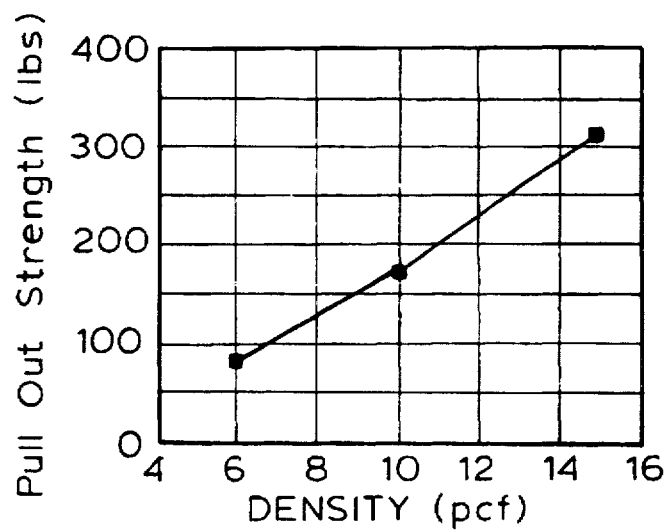
FIGS. 17H–17J depict the fastener retention properties of GECET® F300 resins. Force (in pounds) required to remove dry wall screws (FIG. 17H), finishing nails (FIG. 17I), and galvanized roof nails (17J) from GECET® F300 resin at different densities is depicted.
Figure 17I:
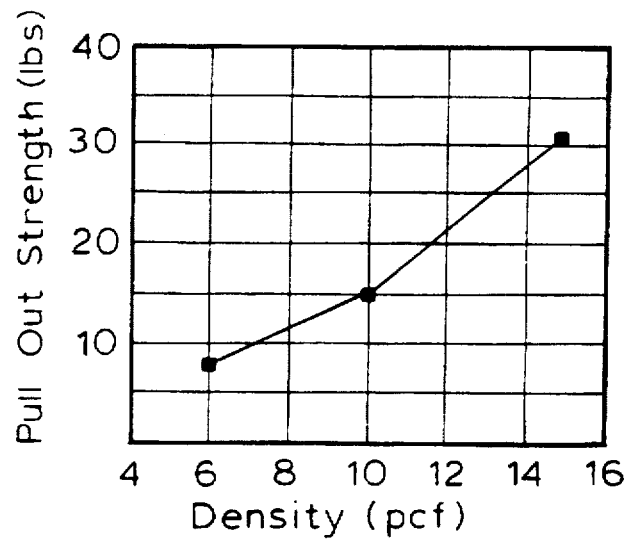
Figure 17J:
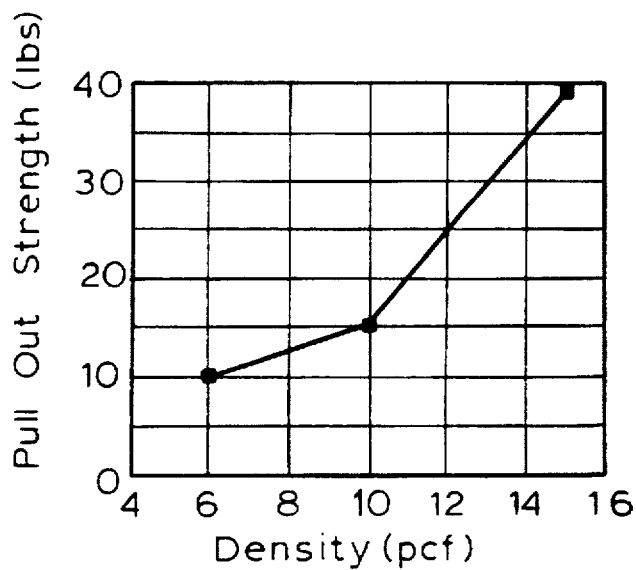

Shoring concrete form networks for pouring horizontal concrete members (e.g., bridges, ceilings, decks, and the like), constitute another significant application for the concrete form panel sheeting of the present invention. As depicted in FIG. 14, a typical shoring structure includes a tower comprising two support frameworks 300A and 300B strengthened with cross braces 302 and topped with joists 304 for supporting the shoring surface or "deck" 306 comprised of concrete form panel sheeting. Adjustable jacks 310 on the vertical support framework members 312 permit precise leveling of the horizontal support framework members 314 and joists. Concrete form panel sheeting is laid across the horizontal joists which, in cooperation with attached side panels 316, define a cavity or hollow or void for pouring the horizontal concrete member. It will be understood that the concrete form panel sheeting of the present invention is useful for other shoring applications, e.g., adjustable horizontal shoring used to construct concrete bridges between two points, post shoring, and the like.

Referring again to the inventive concrete form panel sheeting of FIGS. 2 and 3, the core (A) of the panel sheeting comprises a resinous polymer. By "resinous polymer" is meant any suitable polymer resin. Preferred resinous polymers are thermoplastic resins.

The term "thermoplastic resin" is intended to include any suitable thermoplastic resin, particularly engineering thermoplastic resins possessing superior mechanical properties. Such resins include, but are not limited to, homopolymers or copolymers of polyphenylene ethers, aromatic polycarbonates, polyesters, polyamides, polyarylates, polyetherimides, polysulfones, polyolefins, combinations of more than one of the foregoing, and combinations of one or more of the foregoing with an alkenyl aromatic polymer.

The polyphenylene ether (PPE) (commonly referred to as polyphenylene oxide) resin is normally a homopolymer or copolymer having units of the formula

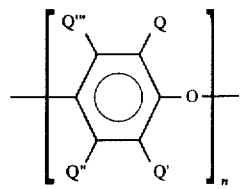

wherein Q, Q', Q", and Q'" are independently selected from the group consisting of hydrogen, halogens, hydrocarbons, halohydrocarbons, hydrocarbonoxys, and halohydrocarbonoxys; and n represents the total number of monomer units and is an integer of at least about 20, and more usually at least 50.

The polyphenylene ether resin can be prepared in accordance with known procedures, such as those described in U.S. Pat. Nos. 3,306,874 and 3,306,875, from the reaction of phenols, including but not limited to: 2,6-dimethylphenol; 2,6-diethylphenol; 2,6-dibutylphenol; 2,6-dilaurylphenol; 2,6-dipropylphenol; 2,6-diphenylphenol; 2-methyl-6-tolylphenol; 2-methoxyphenol; 2,3,6-trimethylphenol; 2,3,5,6-tetramethylphenol, 2,3,5,6-tetraethylphenol and 2,6-diethoxyphenol.

Each of these may be reacted alone to produce the corresponding homopolymer, or in pairs or with another phenol to produce the corresponding copolymer.

Examples of the homopolymers include:

poly(2,6-dimethyl-1,4-phenylene ether), poly(2,6-diethyl-1,4-phenylene ether), poly(2,6-dibutyl-1,4-phenylene ether), poly(2,6-dilauryl-1,4-phenylene ether), poly(2,6-dipropyl-1,4-phenylene ether), poly(2,6-diphenyl-1,4-phenylene ether), poly(2-methyl-6-tolyl-1,4-phenylene ether), poly(2-methyl-6-methoxy-1,4-phenylene ether), poly(2-methyl-6-butyl-1,4-phenylene ether), poly(2,6-dimethoxy-1,4-phenylene ether), poly(2,3,6-trimethyl-1,4-phenylene ether), poly(2,3,5,6-tetramethyl-1,4-phenylene ether), poly(2,3,5,6-tetraethyl-1,4-phenylene ether), and poly(2,6-diethoxy-1,4-phenylene ether).

Examples of the copolymers include especially those of 2,6-dimethylphenol with other phenols, such as poly(2,6-dimethyl-co-2,3,6-trimethyl-1,4-phenylene ether) and poly (2,6-dimethyl-co-2-methyl-6-butyl-1,4-phenylene ether).

For purposes of the invention, an especially preferred family of polyphenylene ethers includes those having alkyl substitution in the two positions ortho to the oxygen ether atom, i.e., those of the above formula where Q and Q' are alkyl, most preferably having from 1 to 4 carbon atoms. Illustrative members of this class are:

poly(2,6-dimethyl-1,4-phenylene)ether;

poly(2,6-diethyl-1,4-phenylene)ether;

poly(2-methyl-6-ethyl,1,4-phenylene)ether;

poly(2-methyl-6-propyl-1,4-phenylene)ether;

poly(2,6-dipropyl-1,4-phenylene)ether;

poly(2-ethyl-6-propyl-1,4-phenylene)ether; and the like.

A highly preferred polyphenylene ether resin for purposes of the present invention is poly(2,6-dimethyl-1,4-phenylene) ether.

Low density foams comprising polyphenylene ether or its copolymers as the primary high polymer component blended with low molecular weight additives, such as triaryl phosphates, fatty amides, plasticizers, brominated BPA derivatives, brominated diphenyl ethers, oligomeric styrenics and hydrogenated derivatives thereof, or esters are also included within the scope of polymers for constructing the core of the invention.

The thermoplastic polyphenylene ether resin can be used alone or modified (e.g., in combination with) at least one other substance, preferably with a polymer, more preferably with an alkenyl aromatic polymer. The term "alkenyl aromatic polymer" is intended to encompass homopolymers as well as copolymers and terpolymers of alkenyl aromatic compounds with one or more other materials. Preferably, the alkenyl aromatic polymer is based at least in part on units of the formula

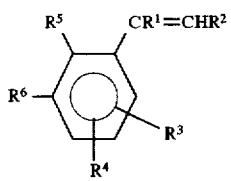

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen, and lower alkyl of from 1 to 6 carbon atoms; $R^5$ and $R^6$ are selected from the group consisting of hydrogen and lower alkyl and alkenyl aromatic groups of from 1 to 6 carbon atoms; or $R^5$ and $R^6$ may be concatenated together with hydrocarbyl groups to form a naphthyl group.

The above will encompass styrene, as well as homologs and analogs of styrene. Specific examples include, in addition to styrene, chlorostyrene, bromostyrene, alpha-methyl styrene, para-methyl styrene, vinyl styrene, divinyl-benzene and vinyl naphthalene. Substantially atactic styrene is especially preferred.

The term "alkenyl aromatic" is intended to include modified alkenyl aromatic compounds, such as rubber modified, high impact alkenyl aromatic resins known in the art. Suitable rubber modifiers, which can be in admixture or interpolymerized with the alkenyl aromatic resin, include natural rubber, as well as synthetic rubbers, such as polyisoprene, polybutadiene, polychloroprene, ethylenepropylene-diene terpolymers (EPDM rubber), styrene-butadiene copolymers (SBR rubber), styrene-acrylonitrile copolymers (SAN), ethylene-propylene copolymers (EPR rubber), acrylonitrile rubbers, polyurethane rubbers and polyorganosiloxane (silicone) rubbers.

Polyphenylene ether (PPE) resins and polystyrene (PS) resins are combinable in wide proportions, e.g., from about 1 to 99 to about 99 to about 1 parts by weight. It is contemplated, however, that low density compositions of the present invention comprise at least two weight percent PPE (based upon the weight of PPE and PS taken together). Compositions containing less than two weight percent PPE are considered to be primarily polystyrene compositions and do not generally exhibit the preferred property improvements associated with PPE/PS blends. It is well-known in the art and well-described in the literature that the addition of PPE to polystyrene blends offers improvements in impact strength, flammability ratings, tensile strength and other mechanical properties. Conversely, polystyrene is typically blended with polyphenylene ether resins to offer better processability for many thermoplastic processes.

Typical PPE/PS blends useful in the practice of the present invention comprise between 10 to 90 percent, and preferably 15 to 80 percent by weight PPE and 90 to 10 percent, preferably 80 to 15 percent by weight PS based upon the weight of the two resins taken together. More preferably, blends of 15 to 50 percent PPE and 85 to 50 percent PS are employed. Such PPE/PS blends are well described in the literature, including U.S. Pat. No. 3,383,435 to Cizek.

The polyphenylene ether resin, with or without the alkenyl aromatic resin, may further comprise a flame retarding agent. Such flame retarding agents are well-known in the art and, in general, may be selected from the group consisting of halogen-containing (e.g., chlorine-and/or bromine-containing) compounds, phosphorous-containing compounds (e.g., organophosphate compounds), nitrogencontaining compounds (e.g., melamine), and fluoropolymers (e.g., PTFE). The flame retardant agent may be used alone or in combination with a flame retardant synergist such as an antimony compound (e.g., antimony trioxide), a molybdenum compound, hydrated alumina, and the like.

As stated above, the term "thermoplastic resin" includes aromatic polycarbonates. The aromatic polycarbonates can be polymers of dihydric phenols and carbonate precursors. The dihydric phenols that can be employed are bisphenols such as bis (4-hydroxyphenol) methane, 2,2-bis(4-hydroxyphenyl) propane (hereinafter referred to as bisphenol-A), 2,2-bis(4-hydroxy-3-methylphenyl) propane, 4,4-bis(4-hydroxyphenyl) heptane, 2,2-bis(4-hydroxy-3,5-dichlorophenyl) propane and 2,2-bis(4-hydroxy-3,5-dibromophenyl) propane; dihydric phenol ethers such as bis(4-hydroxyphenyl) ether, bis(3,5-dichloro-4-hydroxyphenyl) ether, etc.; dihydroxydiphenols such as p,p'-dihydroxydiphenyl, 3,3'-dichloro-4,4'-dihydroxydiphenyl; dihydroxyaryl sulfones such as bis(4-hydroxyphenyl) sulfone, bis(3,5-dimethyl-4-hydroxyphenyl) sulfone; dihydroxy benzenes such as resorcinol and hy(iroquinone; halo- and alkyl-substituted dihydroxy benzenes such as 1,4-dihydroxy-2,5-dichlorobenzene, 1,4-dihydroxy-3-methylbenzene, etc.; and dihydroxy diphenyl sulfoxides such as bis(4-hydroxyphenyl) sulfoxide and bis(4-hydroxyphenol) sulfoxide and bis(3,5-dibromo-4-hydroxyphenol) sulfoxide. A variety of additional dihydric phenols are also available to provide carbonate polymers and are disclosed in U.S. Pat. Nos. 2,999,835; 3,028,365 and 3,153,008.

Also suitable for preparing the aromatic carbonate polymers are copolymers prepared from any of the above which have been copolymerized with halogen-containing dihydric phenols such as 2,2-bis(3,5-dichloro-4-hydroxyphenyl) propane, 2,2-bis(3,5-dibromo-4-hydroxyphenol) propane. Also employed in the practice of the invention may be blends of any of the above materials to provide the aromatic carbonate polymer.

The carbonate precursor may be either a carbonyl halide, a carbonate ester, or a haloformate. The carbonyl halides which can be employed herein are carbonyl bromide, carbonyl chloride, and mixtures thereof. Typical of the carbonate esters which may be employed herein are diphenyl carbonate; di-(halophenyl) carbonates such as di(chlorophenyl) carbonate, di-(bromophenyl) carbonate, di-(trichlorophenyl) carbonate, di-(chloronaphthyl) carbonate, and di-(tribromophenyl) carbonate; di-(alkylphenyl) carbonates such as di-(tolyl) carbonate, di-(naphthyl) carbonate, phenyl tolyl carbonate and chlorophenylchloronaphthyl carbonate, or mixtures thereof. The haloformates suitable for use herein include bis-haloformates of dihydric phenols (bischloroformates of hydroquinone) or glycols (bis-haloformates of ethylene glycol, neopentyl glycol, or polyethylene glycol). While other carbonate precursors will occur to those skilled in the art. carbonyl chloride, also known as phosgene, is preferred. The polycarbonates are prepared by methods well-known to those skilled in the art.

The polyesters include linear saturated condensation products of diols and dicarboxylic acids, or reactive derivatives thereof. Preferably they will comprise condensation products of aromatic dicarboxylic acids or esters and aliphatic diols. It is also possible to use polyesters such as poly(1,4-dimethylolcyclohexane dicarboxylates, e.g., terephthalates). In addition to phthalates, small amounts, e.g., from 0.5 to 15% by weight, of other aromatic dicarboxylic acids, such as naphthalene dicarboxylic acid, or aliphatic dicarboxylic acids, such as adipic acid, can also be present in the compositions. The diol constituent can likewise be varied in the preferred embodiments, by adding small amounts of cycloaliphatic diols. In any event, the preferred polyesters are wellknown as film and fiber formers, and they are provided by methods outlined in U.S. Pat. No. 2,465,319 and U.S. Pat. No. 3,047,539 and elsewhere. The preferred polyesters will comprise a poly (alkylene terephthalate, isophthalate or mixed isophthalate-terephthalate, e.g., up to 30 mole % isophthalate), the alkylene groups containing from 2 to 10 carbon atoms, e.g. poly(etethylene terephthalate) or poly(1,4-butylene terephthalate).

Also included are poly(butylene terephthalate) copolyester resins. Among the units which can be present in the poly(butylene terephthalate) copolyester resins are: aliphatic dicarboxylic acids, e.g., of up to 50 carbon atoms, including cycloaliphatic, straight and branched chain, acids, such as adipic acid, cyclohexanediacetic acid, dimerized $C_{16}$–$C_{18}$ unsaturated acids (which have 32 to 36 carbon atoms), trimerized such acids, and the like. Among the units in the copolyesters can also be minor amounts derived from aromatic dicarboxylic acids, e.g., of up to 36 carbon atoms, such as isophthalic acid. In addition to the 1,4-butylene glycol units, there can also be minor amounts of units derived from other aliphatic glycols and polyols, e.g., of up to 50 carbon atoms, including ethylene glycol, propylene glycol, glycerol and cyclohexanediol. Such copolyesters can be made by techniques well-known to those skilled in the art.

The polyamide resins useful in the practice of the present invention are a generic family of resins known as nylons, characterized by the presence of an amide group (-CONH-) Nylon-6 and nylon-6,6 are the generally preferred polyamides and are available from a variety of commercial sources. Other polyamides, however, such as nylon-4, nylon-12, nylon-6,10, nylon-6,9, or others such as the amorphous nylons may be useful for particular applications.

The polyolefin resin useful in the practice of the present invention includes polyethylenes, polypropylenes, polyisobutylenes, copolymers of olefins, such as of ethylene and propylene, as well as copolymers of olefins (e.g., ethylene) and organic esters such as ethylene vinyl acetate, ethylene ethyl acetate, ethylene methylacrylate, and the like. These are commercially available or are otherwise prepared from known teachings.

It will also be understood that additives may be incorporated into the resins used to construct the panel sheeting of the present invention. Such additives include rubbery impact modifiers, flame retarding agents, blowing agents (e.g., pentane, propane), stabilizers for thermal, color, and radiation (e.g., UV radiation) stability, anti-oxidants, processing aids, plasticizers, anti-static agents, reinforcing and extending fillers, pigments, surfactants, nucleants, lubricants, and others that will be apparent to those of ordinary skill.

A useful resinous polymeric material for formation of the concrete form panel sheeting core is selected by consideration of a material's physical properties, which can be measured with standard mechanical tests and compared, for reference, against the physical properties of conventional HDO plywood concrete form panel sheeting. More particularly, concrete form panel sheeting desirably is relatively rigid, so as to withstand the lateral force exerted on a concrete form by fresh (liquid) concrete. In particular, to comply with American Concrete Institute (ACI) standards, a concrete form (comprising concrete form panel sheeting) cannot flex more than 1/16 of an inch or more than 1/360 the length of the form's longest dimension. A typical 2'×8'×½" concrete form desirably is capable of withstanding, e.g., 1000 lbs./ft$^2$ pressure, and greater strength is desirable because it permits the concrete to be poured more quickly. While an integral stiffener and one or more surface layers of the panel sheeting of the invention contribute(s) significantly to the strength of the panel sheeting, a core material should be selected that contributes to this property of the panel sheeting. At the same time, selection of a material that is less dense (and hence lighter in weight) than HDO plywood is highly preferred.

Concrete form panel sheeting preferably is attached to a concrete form frame or support structure by means of screws, nails, rivets, or the like. Consequently, preferred core materials are sufficiently ductile such that a nail hole can be drilled, or preferably formed by hammering a nail, into the core without cracking the core. Moreover, the core should possess good nail/screw retention characteristics. The core also must withstand the physical abuse likely to be encountered in the field, particularly in an embodiment wherein the panel sheeting consists of a core and a concrete-facing surface layer, but no backside surface layer.

The core material also should be resistant to the environment encountered when pouring concrete. Thus, the material should be capable of withstanding temperatures of, e.g., 20° F. to 180° F. without cracking, warping, appreciable shrinkage, or appreciable expansion. Preferably, the core material also is capable of withstanding temperatures below −20° F., to permit year-round outdoor storage of the panel sheeting and concrete forms made therefrom. Additionally, the behavior of the core material at different temperatures (e.g., expansion or contraction) should be compatible with the behavior of the other materials with which the core cooperates during a pour, such as the concrete-facing surface layer, a backside surface layer, an integral stiffener, and/or a wooden or metal frame.

The core is largely protected from concrete by the concrete-facing surface layer, but not completely protected. For example, nail holes in the concrete-facing surface layer and edges of the panel sheeting are locations where the core material is likely to contact liquid concrete. In panel sheeting that is constructed without a backside surface layer, the opposite (backside) face of the core is likely to be inadvertently contacted by concrete as well, e.g., by splashing. Thus, the core should be non-absorbent and non-reactive with water, with fresh concrete (notably lime), and with any external form release agents (e.g., diesel fuel, Magic Kote® form release) that may be employed at the site. Preferably, the core material is recyclable with only minimal cleaning.

Additionally, the core material preferably is selected to be compatible with the material selected to form a concrete-facing surface layer (B); the material selected to form an optional backside surface layer (C); and the material selected to form an optional integral stiffener. For example, the core and concrete-facing surface layer most preferably are formed from materials that will form a strong, chemically-resistant bond. Also, the materials are selected to have similar coefficients of thermal expansion and contraction.

Because a highly preferred aspect of the inventive panel sheeting is that it possess reduced weight, relative to conventional HDO plywood panel sheeting, a highly preferred resinous polymer core is a foam (e.g., closed or open cell) polymer core. A closed cell polymer is preferred. Processes for foaming (expanding) resinous polymers (particularly polystyrene-type polymers and PPE/PS blends) are well-known in the art and described in the literature. For example, methods are known for imbibing polymer resin beads with a blowing agent, which beads may be expanded (e.g., in a heating operation) at a later time for formation into a foamed article. (See, e.g., Bopp et al., U.S. Pat. No. 5,095,041, incorporated herein by reference). The foam core itself may be formed from the expandable or expanded resinous polymers by well-known means, e.g., by extrusion (see, e.g., Allen et al., U.S. Pat. No. 4,857,390, incorporated herein by reference) or as a molded article (e.g., by expandable bead molding or steam chest molding).

For the foregoing reasons, exemplary compositions for forming the thermoplastic polymer core of the inventive structural member comprise foamed or foamable modified polyphenylene ether resins, expanded or expandable polyolefins, (e.g., expanded polypropylene, expanded polyethylene), expanded or expandable polyolefin copolymers or blends (e.g. polystyrene/polyethylene blends such as ARCEL™), or foamed or foamable polyurethanes. Preferred compositions for forming the thermoplastic polymer core of the inventive structural member comprise foamed or foamable modified polyphenylene ether resins having compositions described above. More preferably, the core is formed from PPE/PS blends. Such low density foamable compositions (and the processing thereof) are described in the literature, see, e.g., U.S. Pat. Nos. 4,727,093 (Allen et al.); 4,874,796 (Allen et al.); 4,920,153 (Allen et al.); 4,927,858 (Joyce & Kelley), 4,968,466 (Allen et al.); 4,992,482 (Joyce & Kelley); 5,064,869 (Bopp et al.); 5,130,340 (Allen); and 5,190,986 (Allen), all of which are incorporated herein by reference. Most preferably, the core is formed from high performance expandable PS/PPE particles, developed by General Electric Company (GE) and Huntsman Corporation (HC) and commercially available from HC (Peru, Ill.) as GECET® expandable engineering resins.

To produce GECET® resins, GE Plastics produces a base resin, to which HC imbibes a blowing agent and various additives to produce a class of resin beads having the following general composition:

poly(phenylene oxide) (PPO® resin), 1–99 wt. %;
polystyrene (PS), 1–99 wt. %;
pentanes, 6.5 wt. % max.;
halogenated organic flame retardants, 0.9 wt. % max.;
plasticizers, 0.4 wt. % max.;
external and internal lubricants, 0.3 wt. % max.; and
Color index Pigment Black #7, 0–5 wt. %. GECET® resin beads of 0.01–0.1 inches in diameter, having a specific gravity of 1.14–1.18 and a softening point of 215°–250° F., are commercially available in three grades: GECET® F100 RESINS, GECET® F200 RESINS, and GECET® F300 RESINS. Typical properties of these three materials, as provided by the manufacturer, are shown in FIGS. 15A–15I, FIGS. 16A–16I, and FIGS. 17A–17J, respectively. All three GECET® grades possess excellent resistance to acids (e.g., concentrated HCl, concentrated $H_2SO_4$, acetic acid, and oleic acid), bases (e.g., 30% KOH), petroleum products (e.g., diesel fuel, kerosene, motor oil, and Murphy's Oil Soap), and lubricating oils (e.g., mineral oil and, cotton seed oil). Grade F100 resin, having a density range of 2.5–40 lbs./ft³, offers the widest range of mechanical properties and moderate heat resistance. Grade F200, having a density range of 3.5–40 lbs./ft³, offers medium heat resistance (usable with temperatures up to 230° F.). Grade F300 has a density range of 4.5–40 lbs/ft³ and is usable at temperatures up to 250° F. For reasons of cost, GECET® F100 and GECET® F200 resins are preferred for the present invention. For more rapid processing, GECET® F300 is preferred.

GECET® resin beads may be processed into a foam core of pre-selected dimensions by adapting techniques wellknown in the art for processing other foam bead resins, e.g., expandable polystyrene (EPS) resins. One preferred technique involves processing the GECET® resin beads into a core member using the manufacturer's (Huntsman's) recommended pre-expansion and steam chest molding process.

First, impregnated GECET® resin beads at a bulk density of about 40 lbs./ft³ are heated with steam or hot air in a steam-jacketed pre-expander or similar apparatus to expand the beads to a desired density. Final densities of 2–30 lbs/ft³, preferably 5–15 lbs./ft³, and more preferably 6–10 lbs./ft³, are preferred, because cores of lower densities may exhibit nail retention problems, and cores of greater densities are undesirably heavy and more expensive to process into finished panel sheeting. Exemplary processing conditions using a high temperature steam jacketed expander are provided in Table I:

TABLE I

Pre-expansion of GECET ® resins

| GECET ® Resin | Desired Density | Pressure (PSI) | Exposure Time (sec.) |
| --- | --- | --- | --- |
| F100 | 6–10 lbs. per ft.³ | 10–25 | 70–80 |
| F200 | 6–10 lbs. per ft.³ | 30–35 | 50 |
| F300 | 6–10 lbs. per ft.³ | 40–45 | 55–70 |

To form a molded core, the expanded GECET® resin beads are injected into a steam chest mold (which may be coated with Teflon® resins or the like to facilitate removal of molded articles) via vacuum transfer and fused under pressure to form a core of desired density. Exemplary molding conditions are provided in Table II:

TABLE II

Molding pre-expanded GECET ® resin into a panel

| Cooling GECET ® Resin (sec) | Desired Density | Temp. (°F.) | Pressure lbs/ft² | Fusing Time (sec.) | Cooling Cycle Time |
| --- | --- | --- | --- | --- | --- |
| F100 | 4–10 lbs per ft³ | 232° | 24–28 | 18–22 | 260–380 |
| F200 | 4–10 lbs. per ft³ | 240° | 32–38 | 25–30 | 260–320 |
| F300 | 4–10 lbs. per ft³ | 258° | 56–60 | 30–35 | 210–230 |

It will be understood by those skilled in the art that the processing conditions given above are exemplary only, and will vary with equipment, with the density and dimensions of the formed article, and the like.

Alternatively, the expanded GECET® resin beads are formed into a core by extruding the beads with an extruder to form a sheet of desired thickness (e.g., 0.25" to 1.5"), and cutting the sheet into core members of desired dimensions. To form concrete form panel sheeting of desired sizes (e.g., sheets of 2'×8'×0.5" to 1.5"), extrusion may be a preferred method for reasons of cost. Other methods for constructing a GECET core, including pultrusion methods, will be apparent to those in the art. A preferred supplier of a GECET foam core suitable for the present invention is Huntsman Corp. in conjunction with Diversified Plastics Corp. (Nixa MO).

CARIL™ expandable engineering beads, manufactured and sold by Shell Nederland Chemie B.V. (The Netherlands) and marketed by GE Plastics Europe (The Netherlands), comprise an alternative polystyrene/polyphenylene ether material suitable for forming the core of the concrete form panel sheeting. Such beads, supplied in multiple grades (e.g., CARIL™ EX402, CARIL™ EX403, CARIL™ EX404), provide heat resistance up to about 120° C. (glass transition temperature of 110°–130° C. for the aforementioned grades). The raw spherical beads (which contain about 6% of pentane expansion agent) are pre-expanded with steam, dried, and molded (preferably in a Teflon-coated mold) to form a core of desired density, using conventional pre-expansion and molding techniques for such materials.

Commercially available, extruded Noryl® foam boards (GE Plastics) also are contemplated as materials for construction of the core member.

Polystyrene copolymer systems, such as poly(styrene-co-maleic anhydride) copolymers (SMA's), comprise a less-preferred family of materials for construction of the core member. Structural members formed from such materials may absorb undesirably large volumes of water and may change shape in response to changes in water content.

In a preferred embodiment the core (A) of the concrete form panel sheeting includes an integral stiffener, which stiffener imparts resistance to deflection to the panel sheeting. Such stiffeners may be composed of, e.g., commercially-available sheet metal (aluminum or steel, for example) or polymer resin materials (including fiber-reinforced polymer materials) such as the polymer materials described herein for face sheets and back sheets.

In a preferred embodiment, commercially-available aluminum or steel sheet metal is stamped to form a stiffener member having (i) a length and width corresponding to the length and width dimensions of the concrete form panel sheeting (e.g., 2'×8'); (ii) a desired corrugation geometry (e.g., trapezoidal); (iii) a corrugation depth less than or equal to the thickness of the core member of the concrete form panel sheeting; and (iv) holes to facilitate manufacture of the core via injection molding procedures. For example, a concrete form panel sheeting having the dimensions of 2'×8'×½" may be constructed having a face sheet of 2'×8'× 1/16", a back sheet of 2'×8'×1/16", a core of 2'×8'×⅜", and a 2'×8'stiffener integral with the core and having corrugation to provide the stiffener with ⅜" depth. An exemplary aluminum stiffener for a 2'×8'×½" panel is stamped from 14 gauge aluminum and has a trapezoidal corrugation geometry that repeats about every 2–3 inches.

To manufacture a core member having an integral stiffener, the stamped stiffener member is placed into a steam chest mold. Expanded GECET® resin beads are injected into the steam chest mold as described above, the filling of the mold being facilitated by the perforations (e.g., 0.25–2 inches in diameter) in the stiffener. Referring again to FIG. 2F, in a preferred embodiment, the stiffener has one to five large holes 18 (e.g., 20–40 mm in diameter), spaced to correspond with the location of one to five polymer bead injectors of the steam chest mold, and a plurality of smaller holes 16 (e.g., 10–20 mm in diameter) to facilitate flow-through during the molding process (to form an integral core structure) while maintaining the strength of the stiffener. Fusion of the beads under pressure forms a core having an integral stiffener.

To form the basic embodiment of concrete form panel sheeting depicted in FIG. 1, the core (A) is bonded to a concrete-facing surface layer (B). The concrete-facing surface layer preferably comprises a resinous polymer, and more preferably a thermoplastic resin, as defined previously for the core. More specifically, the concrete-facing surface layer preferably comprises a modified polyphenylene ether resin. However, numerous other materials, including engineered thermoplastic resins and thermosets may be suitable. Fiber-reinforced thermoplastics and thermosets are suitable as well. The necessary physical properties of this layer provide additional guidelines for selecting the most useful polymers.

For example, the concrete form panel sheeting of the present invention is intended to be reusable, and consequently an essential property of the concrete-facing surface layer is that the layer be adapted to be contacted by fresh (liquid) concrete and to release from the concrete after the concrete has cured. By "concrete" is meant those concretes used in the construction industry, which typically contain hydraulic cements (e.g., Portland cement) having some or all of the following common constituents, which chemically react during the curing process of the concrete: calcium oxide (CaO); silicon dioxide ($SiO_2$); aluminum oxide ($Al_2O_3$); ferric oxide ($Fe_2O_3$); magnesium oxide (MgO); sulfur trioxide ($SO_3$); sodium oxide ($Na_2O$); potassium oxide ($K_2O$), carbon dioxide ($CO_2$); and water. Nonetheless, it is contemplated that the panel sheeting of the invention may be employed in conjunction with masonry cements, oil well cements, refractory cements, and other specialty cements known in the art, without departing from the teachings herein.

For a surface layer to be "adapted to be contacted by fresh (liquid) concrete," the surface layer must, at a minimum, be resistant to chemical or thermal degradation by the concrete, before and during curing thereof. The concrete-facing surface layer should neither react with nor absorb water, fresh concrete, or components thereof.

A surface layer is "adapted to release from concrete after the concrete has cured" if concrete form panel sheeting comprising the surface layer can be separated from the cured concrete (1) without damaging the concrete member, while (2) maintaining the integrity of the panel sheeting, such that the panel sheeting subsequently can be reused. More preferred embodiments of panel sheeting comprise a surface layer requiring less force to release from cured concrete. Preferably, the surface layer is adapted to release from cured concrete with minimal application of an external form release agent or without application of an external form release agent.

The concrete facing surface layer must also be capable of withstanding other conditions encountered by concrete forms in the field. For example, the concrete-facing surface layer desirably is impact resistant, scratch resistant, and sufficiently ductile such that it can be neatly penetrated with a drill or nail, all over the broad temperature ranges likely to be encountered at a job site.

Additionally, to ensure that the panel sheeting has a long useful life, the core arid concrete-facing surface layers should be made from compatible materials to ensure that a strong, chemically resistant bond may be formed therebetween. Lighter concrete-facing surface layers are preferred, though this feature is more important for the core, which generally occupies the major volume of the panel sheeting.

A series of mechanical tests, designed to simulate environmental conditions encountered during the useful life of a concrete form, were performed to select the preferred concrete form panel sheeting surface materials of the invention. These tests may be repeated readily to screen alternative materials, and standard laboratory mechanical tests may be used to pre-screen such alternative materials. The tests used to arrive at preferred materials of the invention included a concrete adhesion test to measure the ease with which a material releases from cured concrete; a penetration test to measure the ease with which a nail may be driven through and removed from a material and the cleanness of penetration; scratch-resistance tests; impact resistance tests; and cleanup tests to measure the ease with which a material can be cleaned for reuse in a subsequent concrete pour.

More particularly, to perform the concrete pouring and adhesion test, a concrete form framework was assembled using industry-standard, steel-framed and plywood-faced concrete forms, resting on a plywood base. A ⅛ to ¾ inch thick test sheet of a candidate surface material (5.25 to 9.75" long×7 to 11.75" inches high) was labelled and attached to the concrete-form face of one of the concrete forms, using double-sided tape. As a control, similar adhesion tests were performed with ½" thick samples of high density overlay Douglas Fir plywood, cut to the same dimensions and treated with Symons® Magic Kote® form oil.

Concrete (5 bag #57 AE 3000PSI mix) was shoveled into the hollow defined by the concrete forms to cover all but the top ½ inch of the test sheet samples. Care was taken not to dislodge the samples, but the conditions were otherwise similar to those encountered in the field. The concrete was cured in place in a warehouse where temperatures varied from approximately 50° to 70° F. After curing the concrete for varying lengths of time ranging from two to ten days, the concrete form framework was disassembled. Since concrete typically is cured only for, e.g., 24 hours prior to removing forms, the longer curing periods simulate adverse pouring conditions.

To varying degrees, the test samples adhered to the concrete after the concrete form framework was disassembled. To measure the relative adhesion of various materials, a clip was attached to the center of the top edge of the sample and also connected to a 50 pound capacity hanging straight scale, calibrated in 8 ounce increments. Force was applied to the scale assembly, in a direction perpendicular to the plane of the test sample until the sample sheet released from the concrete. A separate observer recorded the maximum force applied before release. This adhesion test was repeated as many as 29 times for a given sample, and was performed on samples that had been test scratched as described below and samples that had been frozen to 30° F. to simulate varying environmental conditions that are encountered in the field. Noteworthy changes to samples in the course of testing, such as warping and the formation of surface condensation, were recorded. Of course, a 2'×8' concrete form has about 55 times the surface area of, e.g., a 6"×7" sample of a surface material, and full-size forms are expected to demonstrate a comparable increase in adhesion as compared to such test sample, under comparable conditions.

An evaluation of the surface of the poured and cured concrete was conducted following some of the adhesion tests, and samples were given a rating between 1 and 10. A sample was rated a "1" if the concrete surface was dirty with a dull finish, and a "10" if the concrete surface was very clean with a high-gloss finish. Most samples left a gloss finish on the concrete immediately after removal, which changed to a dull finish after 1–2 days, as is observed with standard plywood concrete form panel sheeting.

The general appearance of test samples was recorded following the above-described adhesion tests, and a clean-up test was conducted on the samples by wiping the samples with a clean dry cotton shop rag and evaluating the relative force required to dislodge any adhering concrete. Where concrete adhered after significant force was applied, the sample was cleaned using water and the ease of clean-up was re-evaluated. In either case, observations were recorded as to whether the cleaning left a film, residue, or powder.

As to general appearance, samples were given a rating of "1" if a heavy concrete build-up was observed following the adhesion test, and a rating of "10" if the samples were relatively clean, with little build-up (or a rating between 1 and 10). Samples were given a relative clean-up rating inversely proportional to the force needed to clean the sample. Samples that were difficult to clean or very scratched were rated "1"; samples that were easily cleaned with few visible scratches were rated "10."

Penetration tests were conducted at 30° F. and 70° F. by placing test samples of the dimensions described above against a wood backing and driving a 16-penny steel nail through the sample using a standard carpenter's hammer. The nail was then removed by hand. The test samples were examined for undesirable fracturing, and were subjectively evaluated for ease of nail-removal. The cleanliness of nail penetration also was evaluated. A sample was given a penetration rating of "1" if penetration was rough and multiple fractures were observed. A rating of "10" was given to samples that were penetrated smoothly with no observable fractures.

Two scratch-resistance tests were performed using a 7"×2.5"×8" steel block weighing 40 pounds and attached to (a) a nail, and (b) sandpaper. A 16-penny nail was welded in a hole through the block so that the nail's point protruded approximately 0.25 inches from the largest surface. An ⅛ inch thick test sample of material was attached with double-sided tape to a 2'×12'×1.5" pine board, and the steel block was dragged across the surface of the sample. Using a microscope, the width of the scratch imparted by the nail was recorded, and the scratch was subjectively rated from 1 to 10, where a "1" (poor) rating was defined as a deep, wide, crooked scratch with debris visible on its edges, and a "10" (excellent) rating was defined as a shallow, narrow, straight, and clean scratch.

For the sandpaper scratch-resistance test, a 12"×18" sheet of 60 SIC Resin E-CL sandpaper was attached to a different surface of the steel block, and the block was dragged across separate test samples eight times. The resulting scratches were rated on the same relative scale, with a "1" being given for samples that had multiple, deep scratches and a "10" for samples with few, shallow scratches.

Blunt-end and sharp-point impact-resistance tests were conducted on samples placed flat against a GECET® backing (6 lb./ft$^3$ density) using a 2 lb., 13 oz., steel stake, one end having a flat surface 0.75" in diameter and the other end tapered to a point 0.08" in diameter. The stake was dropped vertically from a height of four feet above the sample (measured from the lower end of the stake), providing an impact energy of 11.25 foot pounds, and the sample was evaluated for fracturing and depth of penetration. A sample was given an impact rating of "1" if it was completely fractured or punctured, and a rating of "10" if it was unfractured or received an insignificant puncture. The impact resistance tests were conducted at 30° F. and 70° F. on samples, after concrete had been poured and cured against the samples twice.

The foregoing durability tests (penetration, scratch-resistance and impact-resistance tests) were designed to mimic field conditions that might be encountered by the panel sheeting of a concrete form. One can pre-screen potential concrete-facing surface layer materials for penetration properties, scratch-resistance, and impact-resistance using standard laboratory mechanical tests, in addition to the tests outlined above.

The foregoing battery of tests was conducted on samples of numerous materials to determine optimum concrete-facing surface layer materials. Such tested materials included polyethylenes (PE), polypropylenes (PP), glass-reinforced polypropylenes (e.g., AZDEL materials (Azdel Inc., Shelby, N.C., U.S.A.)), polyvinyl chloride (PVC), polyamides, polytetrafluoro-ethylenes (PTFE), acrylonitrile-butadiene-styrene (ABS) polymers, high impact polystyrenes (HIPS), modified polyphenylene ethers (including Noryl® resins from General Electric Co., Plastics Division) and GECET® resins), Delrin® acetal resins (Du Pont, Wilmington Del.), spray coatings over GECET® resins, painted coatings, and urethane-coated aluminum. Of the materials tested, the non-expanded, modified PPE resins were preferred, as explained below.

Polypropylene materials released well from concrete and were easy to clean, but demonstrated a tendency to shatter at low temperatures in impact tests. Such materials also may undergo undesirable post-crystallization and warp in the sunlight or when exposed to excessive heat. Polyethylene materials provided acceptable results in the above-battery of tests, but performed poorly on release from concrete after several pours. Polyolefin surface materials in general (e.g., PE and PP materials) have excellent concrete-releasing characteristics and hydrophobicity, but are less preferred because they do not strongly bond with the preferred GECET® resin core members of the invention and because of a tendency to warp if post-crystallization occurs. The Azdel® materials bonded GECET® resin cores more favorably, but also shattered at low temperatures.

Azdel® thermoplastic composite materials (and other continuous and/or chopped filament glass fiber-reinforced polypropylene homopolymer materials or the like) are preferred face sheet materials by virtue of their superior strength properties. Azdel® thermoplastic composites comprise 80–20% polypropylene, 20–80% fibrous glass (consisting principally of oxides of silicon, aluminum, calcium, boron, and magnesium fused in an amorphous vitreous state), and 0–5% antioxidants, pigments, and processing aids; have a melting point of 327° F.; and a specific gravity of 1.08–1.30. Typical physical properties of exemplary, commercially-available Azdel® products are depicted in Tables IIA–IIC:

TABLE IIA

AZDEL D-R401-B01

| PROPERTY | TYPICAL DATA | UNIT | METHOD |
|---|---|---|---|
| MECHANICAL | | | |
| Tensile Strength | 18.7 | ksi | ASTM D-638 |
| Tensile Elongation at break | 2.5 | % | ASTM D-638 |
| Tensile Modulus | 925 | ksi | ASTM D-638 |
| Poisson's Ratio | .361 | | ASTM D-638 |
| Flexural Strength | 27.7 | ksi | ASTM D-790 |
| Flexural Modulus | 951 | ksi | ASTM D-790 |
| Compresive Strength | 17.2 | ksi | ASTM D-695 |
| IMPACT | | | |
| Izod Impact, notched, 73° F., 0.125" | 15.2 | ft-lb/in | ASTM D-256 |
| Multiaxial Impact (0.125" thickness) | | | ASTM D-3763 |
| Max. Load | 845 | lbs. | |
| Energy Max. Ld | 11.3 | ft-lbs | |
| Energy @ Failure | 21.1 | ft-lbs | |
| THERMAL | | | |
| HDT, 264 psi | 309 | degrees F. | ASTM D-648 |
| PHYSICAL | | | |
| Glass Content by Weight | 40.0 | % | Ashing |
| Specific Gravity, solid | 1.19 | — | ASTM D-792 |
| Mold Shrinkage | 0.1–0.3 | % | ASTM D-955 |
| Basis Weight | 0.90 | lbs/ft² | |

HDT = heat deflection temperature

TABLE IIB

AZDEL D-U421-B01 (directionalized fibers)

| PROPERTY (Measured in longitudial direction) | TYPICAL DATA | UNIT | METHOD |
|---|---|---|---|
| MECHANICAL | | | |
| Tensile Strength | 32.6 | ksi | ASTM D-638 |
| Tensile Elongation at break | 2.5 | % | ASTM D-638 |
| Tensile Modulus | 1457.7 | ksi | ASTM D-638 |
| Poisson's Ratio | 0.377 | | ASTM D-638 |
| Flexural Strength | 33.7 | ksi | ASTM D-790 |
| Flexural Modulus | 1080.3 | ksi | ASTM D-790 |
| Compressive Strength | 19.7 | ksi | ASTM D-695 |
| IMPACT | | | |
| Izod Impact, notched, 73° F., 0.125" | 30.8 | ft-lbs/in | ASTM D-256 |
| Multiaxial Impact (0.125" thickness) | | | ASTM D-3763 |
| Max. Load | 1554 | lbs. | |
| Energy Max. Ld | 28.1 | ft-lbs | |
| Energy @ Failure | 42.9 | ft-lbs | |
| THERMAL | | | |
| HDT, 264 psi | 316 | degrees F. | ASTM D-648 |
| PHYSICAL | | | |
| Glass Content by Weight | 42.0 | % | Ashing |
| Specific Gravity | 1.21 | — | ASTM D-792 |
| Mold Shrinkage | 1–3 | % | ASTM D-955 |
| Basis Weight | 0.95 | lbs/ft² | |

HDT = heat deflection temperature

TABLE IIC

| AZDEL D-U421-B01 (directionalized fibers) | | | |
|---|---|---|---|
| PROPERTY (Measure in transverse direction | TYPICAL DATA | UNIT | METHOD |
| MECHANICAL | | | |
| Tensile Strength | 13.1 | ksi | ASTM D-638 |
| Tensile Elongation at break | 2.3 | % | ASTM D-638 |
| Tensile Modulus | 768.8 | ksi | ASTM D-638 |
| Poisson's Ratio | 0.361 | | ASTM D-638 |
| Flexural Strength | 22.7 | ksi | ASTM D-790 |
| Flexural Modulus | 792.0 | ksi | ASTM D-790 |
| Compressive Strength | 13.6 | ksi | ASTM D-695 |
| IMPACT | | | |
| Izod Impact, notched, 73° F., 0.125" | 13.5 | ft-lb/in | ASTM D-256 |
| Multiaxial Impact (0.125" thickness) | | | ASTM D-3763 |
| Max. Load | 1554 | lbs. | |
| Energy Max. Ld | 18.1 | ft-lbs | |
| Energy @ Failure | 42.9 | ft-lbs. | |
| THERMAL | | | |
| HDT, 264 psi | 289 | degrees F. | ASTM D-648 |
| PHYSICAL | | | |
| Glass Content by Weight | 42.0 | % | Ashing |
| Specific Gravity | 1.21 | — | ASTM D-792 |
| Mold Shrinkage | .1–.3 | % | ASTM D-955 |
| Basis Weight | 0.95 | lbs/ft² | |

HDT = heat deflection temperature

Compression molding, stamping, thermoforming, and other techniques known in the art and/or provided by the manufacturer may be used to fabricate Azdel® materials into a face sheet for use in the panel sheeting of the invention.

PTFE materials are less preferred because of suboptimal performance in the battery of durability tests.

ABS materials performed well in concrete adhesion tests, but are less preferred for reasons of cost and because of sub-optimal performance in the durability tests. Also, ABS materials have an undesirable tendency to become embrittled from UV radiation exposure.

DELRIN® acetal resins released well from concrete in concrete adhesion tests, but performed below average in the battery of durability tests.

Polystyrene materials performed suboptimally in durability tests and were difficult to clean, and hence, are less preferred.

HIPS materials are less preferred due to their softness. These materials performed average or below average in impact-resistance tests and scratch-resistance tests, and large holes and a minor fracture were formed in the penetration test. Most importantly, HIPS materials performed poorly relative to preferred materials in concrete adhesion tests, particularly after 6 or more pours against a sample, and also became more difficult to clean.

Urethane coatings in general (sprayed and painted onto GECET®, and urethane-coated aluminum) bonded strongly to concrete in the adhesion test, and therefore are less preferred. For example, 15–26 pounds of force were required to remove urethane coated aluminum samples from cured concrete in the above-described adhesion test, using samples that had concrete poured and cured against them 0–4 times. These results were considerably inferior to the 2–5 pounds of force usually required to remove samples of preferred materials that had concrete poured and cured against them a comparable number of times. Moreover, urethane coatings do not add nearly as much strength to the the panel sheeting as more preferred rigid surface materials.

Coated aluminum materials in general are less preferred as concrete-facing surface layers, due to their excessive weight, relative to preferred Noryle® resin materials.

Uncoated GECET® F300 samples were unsatisfactory, as they strongly adhered to concrete and performed poorly in clean-up and durability tests.

Polyamide materials (nylons) performed above average in some durability tests and in concrete adhesion tests, but scratched easily and display a tendency to absorb water, making such materials less preferred.

Samples of Noryl® resins from GE Plastics demonstrated the best overall performance of surface materials tested. Moreover, such materials bond extremely well to GECET® resins because such materials are themselves modified PPE resins. Preferred Noryl® resins include PPE/HIPS blends (e.g., Noryl® PX0844 resins, Noryl® PX1718 resins, Noryl® PX4685 resins, and Noryl® MX5314 resins); filled PPE blends (e.g., mineral-filled PPE blends, such as Noryl® HS1000X resins, (clay-filled, impact modified, flame-retardant PPE resins)); and PPE/polyamide blends (e.g., Noryl GTX® 909 resins (PPE/nylon blends)).

More particularly, Noryl® PX0844 resins, commercially available from GE Plastics, are non-flame retardant PPE/HIPS blends that typically possess the properties depicted in Table IIIA, according to the manufacturer:

TABLE IIIA

| NORYL ® RESIN: PX0844 | | | |
|---|---|---|---|
| PROPERTY | TYPICAL DATA | UNIT | METHOD |
| MECHANICAL | | | |
| Tensile Strength, yield, Type I, 0.125" | 7200 | psi | ASTM D 638 |
| Tensile Elongation, break, Type I, 0.125" | 42.0 | % | ASTM D 638 |
| Flexural Strength, yield, 0.250" | 11000 | psi | ASTM D 790 |
| Flexural Modulus, 0.250" | 325000 | psi | ASTM D 790 |
| Hardness, Rockwell R | 114 | — | ASTM D 785 |
| IMPACT | | | |
| Izod Impact, notched, 73° F. | 4.4 | ft-lb/in | ASTM D 256 |
| Izod Impact, notched, –40° F. | 2.5 | ft-lb/in | ASTM D 256 |
| THERMAL | | | |
| HDT, 66 psi, 0.250" unannealed | 250 | degrees F. | ASTM D 648 |
| HDT, 264 psi, 0.250", unannealed | 235 | degrees F. | ASTM D 648 |
| CTE, flow, 32° to 212° F. | 4.1 E-5 | in/in-F | ASTM E 831 |
| PHYSICAL | | | |
| Specific Gravity, solid | 1.06 | — | ASTM D 792 |
| Water Absorption, 24 hours @ 73 F. | 0.100 | % | ASTM D 570 |
| Mold Shrinkage, flow, 0.125" | 5–7 | in/in E-3 | ASTM D 955 |

HDT = heat deflection temperature

The manufacturer's suggested injection molding guidelines are summarized in Table III B:

TABLE IIIB

NORYL ® RESIN: PX0844

INJECTION MOLDING GUIDELINES

| | |
|---|---|
| MELT TEMPERATURE | 550–580° F. |
| BARREL TEMPERATURE | |
| Nozzle | 550–580° F. |
| Front | 560–580° F. |
| Middle | 540–570° F. |
| Rear | 530–550° F. |
| MOLD TEMPERATURE | 120–180° F. |
| DRYING BASICS, min 2–4 hrs | 210–225° F. |
| INJECTION PRESSURE (psi) | 10000–16000 |
| HOLDING PRESSURE (psi) | 9000–13000 |
| BACK PRESSURE (psig) | 50–100 |
| SCREW SPEED (rpm) | 25–75 |
| % SHOT SIZE TO BARREL CAPACITY | 40–75 |
| CLAMP TONNAGE (tons per sq. in) | 3–5 |
| INJECTION SPEED | MED–FAST |
| MOLD SHRINKAGE (in/in) | 0.005–0.007 |
| CUSHION (in) | 0.125 |

Noryl® PX1718 resins, commercially available from GE Plastics, comprise PPE/HIPS blends to which triarylphosphate ester flame retardants have been added. The manufacturer reports that these resins typically possesses the properties depicted in Table IV A:

TABLE IVA

NORYL ® RESIN: PX1718

| PROPERTY | TYPICAL DATA | UNIT | METHOD |
|---|---|---|---|
| MECHANICAL | | | |
| Tensile Strength, yield, Type I, 0.125" | 8500 | psi | ASTM D 638 |
| Tensile Elongation, break, Type I 0.125" | 25.0 | % | ASTM D 638 |
| Flexural Strength, yield, 0.125" | 13500 | psi | ASTM D 790 |
| Flexural Modulus, 0.125" | 365000 | psi | ASTM D 790 |
| Hardness, Rockwell R | 116 | — | ASTM D 785 |
| IMPACT | | | |
| Izod Impact, notched, 73° F. | 4.5 | ft-lb/in | ASTM D 256 |
| Izod Impact, notched, –40° F. | 2.5 | ft-lb/in | ASTM D 256 |
| Gardner Impact, 73° F. | 13 | ft-lbs | ASTM D 3029 |
| Gardner Impact, –40° F. | 6 | ft-lbs | ASTM D 3029 |
| THERMAL | | | |
| HDT, 66 psi, 0.250", unannealed | 245 | degress F. | ASTM D 648 |
| HDT, 264 psi, 0.250", unannealed | 215 | degrees F. | ASTM D 648 |
| CTE, flow, –40° F. to 200° F. | 3.8 E-5 | in/in-F | ASTM E 831 |
| PHYSICAL | | | |
| Specific Gravity, solid | 1.09 | — | ASTM D 792 |
| Water Absorption, 24 hours @ 73° F. | 0.070 | % | ASTM D 570 |
| Mold Shrinkage, flow, 0.125" | 5–7 | in/in E-3 | ASTM D 955 |
| ELECTRICAL | | | |
| Dielectric Strength, in oil, 125 mils | 630 | V/mil | ASTM D 149 |
| Dielectric Constant, 60 Hz | 2.79 | — | ASTM D 150 |
| Dissipation Factor, 60 Hz | 0.0031 | — | ASTM D 150 |

The manufacturer's suggested injection molding guidelines are summarized in Table IVB:

TABLE IVB

NORYL ® RESIN: PX1718

PRELIMINARY DATA: DTUL 220 F.

INJECTION MOLDING GUIDELINES

| | |
|---|---|
| SPECIFIC GRAVITY | 1.09 |
| MOLD SHRINKAGE | 0.005–0.007 in/in |
| MELT TEMPERATURE | 500° F.–550° F. |
| CYLINDER TEMPERATURES | |
| Rear | 490° F.–510° F. |
| Middle | 500° F.–520° F. |
| Front | 510° F.–530° F. |
| Nozzle | 500° F.–540° F. |
| MOLD TEMPERATURE | 160° F.–200° F. |
| DRYING BASICS | |
| Temperatures | 220° F.–230° F. |
| Times | 2–4 hours |
| INJECTION PRESSURE | 12000–15000 psi |
| HOLDING PRESSURE | 9000–12000 psi |
| BACK PRESSURE | 50–100 psi |
| INJECTION SPEED | MED–FAST |
| SCREW SPEED | 40–80 rpm |
| SHOT SIZE TO BARREL CAPACITY | 40–80% |
| CLAMP TONNAGE | 3–5 tons psi |
| MOLD SHRINKAGE | 5–7 in/in E-3 |
| CUSHION | 0.125 in |
| RECOMMENDED MIN PART THICKNESS | 0.060 in |

Noryl® MX5314 resins, commercially available from GE Plastics, are flame-retardant PPE/HIPS blends fire retarded with triarylphosphate esters and having a composition and properties similar to PX1718 resins, except that MX5314 resins contain post-consumer recycled materials. Table V A contains typical properties reported by the manufacturer for MX5314 resins:

TABLE VA

NORYL ® RESIN: MX5314

| PROPERTY | TYPICAL DATA | UNIT | METHOD |
|---|---|---|---|
| MECHANICAL | | | |
| Tensile Strength, yield, Type I, 0.125" | 9000 | psi | ASTM D 638 |
| Tensile Elongation, break, Type I 0.125" | 26.0 | % | ASTM D 638 |
| Flexural Strength, yield, 0.250" | 14300 | psi | ASTM D 790 |
| Flexural Modulus, 0.250" | 380000 | psi | ASTM D 790 |
| IMPACT | | | |
| Izod Impact, notched, 73° F. | 2.8 | ft-lb/in | ASTM D 256 |
| THERMAL | | | |
| HDT, 264 psi, 0.250", unannealed | 212 | degree F. | ASTM D 648 |
| PHYSICAL | | | |
| Specific Gravity, solid | 1.12 | — | ASTM D 792 |
| Mold Shrinkage, flow, 0.125" | 5–7 | in/in E-3 | ASTM D 955 |
| Mold Shrinkage, xflow | 5–7 | in/in E-3 | ASTM D 955 |
| FLAME CHARACTERISTICS | | | |
| UBC Standard 52-4 | CC1 | — | ASTM D 635 |
| OTHER | | | |

TABLE VA-continued

NORYL ® RESIN: MX5314

| PROPERTY | TYPICAL DATA | UNIT | METHOD |
|---|---|---|---|
| Pre/post Consumer Recycle Content | 25 | Minimum % | FTC Regs |

The manufacturer's injection molding guidelines are summarized in Table V B.

TABLE VB

NORYL ® RESIN: MX5314

INJECTION MOLDING GUIDELINES

| | |
|---|---|
| DRYING | 2–4 hrs at 220–230° F., 6 hrs max |
| TEMPERATURES (F.) | |
| Melt | 500° F.–550° F. |
| Rear | 490° F.–510° F. |
| Middle | 500° F.–520° F. |
| Front | 510° F.–530° F. |
| Nozzle | 500° F.–550° F. |
| Mold | 160° F.–200° F. |
| BACK PRESSURE (psig) | 50–100 |
| SCREW SPEED (rpm) | 40–80 |
| SUGGESTED SHOT SIZE | 40–80% of machine capacity |
| PURGE: HDPE/PS | |

Noryl® PX4685 resins, commercially available from GE Plastics, also comprise PPE/HIPS blends. This low-cost product is made with scrap materials and will contain variable levels of flame retardants. Table VI A contains typical properties reported by the manufacturer for PX4685 resins:

TABLE VIA

NORYL ® RESIN: PX4685

| PROPERTY | TYPICAL DATA | UNIT | METHOD |
|---|---|---|---|
| MECHANICAL | | | |
| Tensile Strength, yield, Type I, 0.125" | 7300 | psi | ASTM D 638 |
| Tensile Strength, break, Type I, 0.125" | 7100 | psi | ASTM D 638 |
| Tensile Elongation, yield, Type I 0.125" | 6.0 | % | ASTM D 638 |
| Tensile Elongation, break, Type I 0.125" | 24.0 | % | ASTM D 638 |
| Flexural Strength, yield, 0.250 | 11600 | psi | ASTM D 790 |
| Flexural Modulus, 0.250" | 332000 | psi | ASTM D 790 |
| IMPACT | | | |
| Izod Impact, notched, 73° F. | 2.5 | ft-lb/in | ASTM D 256 |
| THERMAL | | | |
| HDT, 66 psi, 0.250" unannealed | .230 | deg F. | ASTM D 648 |
| HDT, 264 psi, 0.250", unannealed | 212 | deg F. | ASTM D 648 |
| Thermal Index, Elec Prop | 50 | deg C. | UL 746B |
| Thermal Index, Mech Prop with impact | 50 | deg C. | UL 746B |
| Thermal Index, Mech prop without impact | 50 | deg C. | UL 746B |

TABLE VIA-continued

NORYL ® RESIN: PX4685

| PROPERTY | TYPICAL DATA | UNIT | METHOD |
|---|---|---|---|
| PHYSICAL | | | |
| Specific Gravity, solid | 1.10 | — | ASTM D 792 |
| Mold Shrinkage, flow, 0.125 | 5–7 | in/in E-3 | ASTM D 955 |
| FLAME CHARACTERISTICS | | | |
| UL File Number, USA | E121562 | — | — |
| 94HB Rated (tested thickness) | 0.063 | inch | UL 94 |

The manufacturer's injection molding guidelines are summarized in Table VI B:

TABLE VIB

NORYL ® RESIN: PX4685

INJECTION MOLDING GUIDELINES

| | |
|---|---|
| MOLD SHRINKAGE (in/in E-3) | 5–7 |
| DRYING | 2–4 hrs at 190–205° F. |
| TEMPERATURE (°F.) | |
| MELT | 530–560 |
| Rear | 510–530 |
| Middle | 520–540 |
| Front | 540–560 |
| Nozzle | 530–560 |
| Mold | 120–180 |
| INJECTION SPEED | MED–FAST |
| INJECTION PRESSURE (psi) | 8000–16000 |
| HOLDING PRESSURE (psi) | 7000–10000 |
| BACK PRESSURE (psig) | 50–100 |
| SCREW SPEED (rpm) | 25–75 |
| SUGGESTED SHOT SIZE | 40–75% to machine capacity |
| CLAMP TONNAGE (tons psi) | 3–5 |

Noryl® HS1000X resins, commercially available from GE Plastics, are flame-retardant, mineral-filled PPE resins, and typically possess properties as reported in Table VII A, according to the manufacturer:

TABLE VIIA

NORYL ® RESIN: HS1000X

| PROPERTY | TYPICAL DATA | UNIT | METHOD |
|---|---|---|---|
| MECHANICAL | | | |
| Tensile Strength, yield, Type I, 0.125" | 9500 | psi | ASTM D 638 |
| Tensile Strength, break, Type I, 0.125" | 7400 | psi | ASTM D 638 |
| Tensile Elongation, yield, Type I 0.125" | 7.6 | % | ASTM D 638 |
| Tensile Elongation, break, Type I 0.125" | 30.0 | % | ASTM D 638 |
| Flexural Strength, yield, 0.250" | 15000 | psi | ASTM D 790 |
| Flexural Modulus, 0.250" | 420000 | psi | ASTM D 790 |
| Hardness, Rockwell R | 121 | — | ASTM D 785 |
| IMPACT | | | |
| Izod Impact, unnotched, 73 F. | 28.3 | ft-lb/in | ASTM D 256 |
| Izod Impact, notched, 73 F. | 2.5 | ft-lb/in | ASTM D 256 |

TABLE VIIA-continued

NORYL ® RESIN: HS1000X

| PROPERTY | TYPICAL DATA | UNIT | METHOD |
|---|---|---|---|
| Instrumented Impact Energy & Peak, 73 F. | 18.4 | ft-lbs | ASTM D 3763 |
| THERMAL | | | |
| Vicat Softening Temp, Rate B | 258 | deg F. | ASTM D 1525 |
| HDT, 66 psi, 0.250" unannealed | 209 | deg F. | ASTM D 648 |
| HDT, 264 psi, 0.250", unannealed | 200 | deg F. | ASTM D 648 |
| Thermal Index, Elec Prop | 100 | deg C. | UL 746 B |
| Thermal Index, Mech Prop with impact | 85 | deg C. | UL 746 B |
| Thermal Index, Mech prop without impact | 100 | deg C. | UL 746 B |
| PHYSICAL | | | |
| Specific Gravity, solid | 1.23 | — | ASTM D 792 |
| Water Absorption, 24 hours @ 73 F. | 0.070 | % | ASTM D 570 |
| Mold Shrinkage, flow, 0.125" | 5–7 | in/in E-3 | ASTM D 955 |
| ELECTRICAL | | | |
| Volume Resistivity | 1.6 E16 | ohm-cm | ASTM D 257 |
| Surface Resistivity | >1.0 E16 | ohm/sq | ASTM D 257 |
| Dielectric Strength, in oil, 125 mils | 452 | V/mil | ASTM D 149 |
| Dielectric Constant, 50 Hz | 3.03 | — | ASTM D 150 |
| Dielectric Constant, 1 MHz | 2.83 | — | ASTM D 150 |
| Dissipation Factor, 50 Hz | 0.0270 | — | ASTM D 150 |
| Dissipation Factor, 1 kHz | 0.0070 | — | ASTM D 150 |

The manufacturer's injection molding guidelines are summarized in Table VII B:

TABLE VIIB

NORYL ® RESIN: HS1000X

High strength resin. UL94 V-0/5VA rated.

INJECTION MOLDING GUIDELINES

| MELT TEMPERATURES CYLINDER TEMPERATURES | 480° F.–540° F. | |
|---|---|---|
| Rear | 450° F.–480° F. | |
| Middle | 470° F.–500° F. | |
| Front | 490° F.–520° F. | |
| Nozzle | 500° F.–530° F. | |
| MOLD TEMPERATURES DRYING BASICS | 150° F.–180° F. | |
| Temperatures | 210° F.–220° F. | |
| Times | 2–4 hours | |
| INJECTION PRESSURE | 83–124 MPa | 12000–18000 psi |
| HOLDING PRESSURE | 55–83 MPa | 8000–12000 psi |
| BACK PRESSURE | 0.35–0.69 MPa | 50–100 psi |
| INJECTION SPEED | SLOW-MED | SLOW-MED |
| SCREW SPEED | 40–80 rpm | 40–80 rpm |
| SHOT SIZE TO BARREL CAPACITY | 40–80% | 40–80% |
| CLAMP TONNAGE | 3–5 tons psi | 3–5 tons psi |
| MOLD SHRINKAGE | 0.5–0.7% | 5–7 in/in E-3 |
| CUSHION | 3 mm | 0.125 in |
| RECOMMENDED MIN PART THICKNESS | 1.70 mm | 0.060 in |

Noryl® GTX® 909 resins, commercially available from GE Plastics, are PPE/nylon-6.6 blends that, according to the manufacturer, typically possess the properties depicted in Table VIII A:

TABLE VIIIA

NORYL ® GTX ® RESIN: GTX909

| PROPERTY | TYPICAL DATA | UNIT | METHOD |
|---|---|---|---|
| MECHANICAL | | | |
| Tensile Strength, yield, Type I, 0.125" | 9700 | psi | ASTM D 638 |
| Tensile Strength, break, Type I, 0.125" | 8700 | psi | ASTM D 638 |
| Tensile Elongation, yield, Type I 0.125" | 9.0 | % | ASTM D 638 |
| Tensile Elongation, break, Type I 0.125" | 50.0 | % | ASTM D 638 |
| Flexural Strength, yield, 0.250" | 14400 | psi | ASTM D 790 |
| Flexural Modulus, 0.250" | 345000 | psi | ASTM D 790 |
| IMPACT | | | |
| Izod Impact, notched, 73 F. | 3.3 | ft-lb/in | ASTM D 256 |
| Izod Impact, notched, −20 F. | 2.0 | ft-lb/in | ASTM D 256 |
| Instrumented Impact Energy @ Peak, 73° F. | 30.0 | ft-lbs | ASTM D 3763 |
| Instrumented Impact Energy @ Peak, −20° F. | 18.0 | ft-lbs | ASTM D 3763 |
| THERMAL | | | |
| Vicat Softening Temp, Rate B | 474 | deg F. | ASTM D 1525 |
| HDT, 66 psi, 0.250" unannealed | 400 | deg F. | ASTM D 648 |
| HDT, 264 psi, 0.250", unannealed | 257 | deg F. | ASTM D 648 |
| CTE, flow, 0° F. to 300° F. | 5.3 E-5 | in/in-F | ASTM E 831 |
| CTE, xflow, 0° F. to 300° F. | 4.5 E-5 | in/in-F | ASTM E 831 |
| PHYSICAL | | | |
| Specific Gravity, solid | 1.13 | — | ASTM D 792 |
| Water Absorption, 24 hours @ 73° F. | 0.540 | % | ASTM D 570 |
| Water Absorption, equilibrium, 73° F. | 4.40 | | ASTM D 570 |
| Mold Shrinkage, flow, 0.125" | 13–17 | in/in E-3 | ASTM D 955 |
| ELECTRICAL | | | |
| Volume Resistivity | 4.40 E16 | ohm-cm | ASTM D 257 |
| Surface Resistivity | 1.70 E16 | ohm/sq | ASTM D 257 |
| Dielectric Strength, in oil, 125 mils | 650 | V/mil | ASTM D 149 |
| Dielectric Constant, 50 Hz | 3.27 | — | ASTM D 150 |
| Dielectric Constant, 1 MHz | 2.76 | — | ASTM D 150 |
| Dissipation Factor, 50 Hz | 0.0390 | — | ASTM D 150 |
| Dissipation Factor, 1 MHz | 0.0190 | — | ASTM D 150 |

The manufacture injection molding guidelines are summarized in Table VIII B.

TABLE VIIIB

NORYL ® GTX ® RESIN: GTX909

INJECTION MOLDING GUIDELINES

NORYL GTX resin should not be mixed with other grades of NORYL resins.
BASIC DRYING: (1) - 2-4 hrs at 200° F., 6 hrs max

TABLE VIIIB-continued

NORYL ® GTX ® RESIN: GTX909

| TEMPERATURES (°F.) | | |
|---|---|---|
| Melt (2) | | 520–560 |
| Rear | | 500–540 |
| Middle | | 510–550 |
| Front | | 520–560 |
| Nozzle (3) | | 520–560 |
| Mold | | 150–200 |
| INJECTION PRESSURE | 1st stage | 10000–20000 psi |
| | 2nd stage | 7000–13000 psi |
| BACK PRESSURE | | 50–100 psi |
| RAM SPEED | | MED–FAST |
| SCREW SPEED | | 40–80 rpm |
| SHOT SIZE TO BARREL CAPACITY (4) | | 30–60% |
| NOZZLE SIZE (SHORT OPEN BORE) | | 0.1875" min orifice |
| REGRIND (must be dried also) | | 25% |
| PURGE: | Polystryene and acrylic regrind are effective purging materials. Use temperature range appropriate for particular puring resin. | |

Notes:
(1) Dry at recommended temperatures and times for optimum performance. Overdrying can cause loss of physical properties and/or create appearance defects. Do not exceed recommended basic drying time and temperature above or:
6–12 hrs at 175° F., 16 hrs. max.
8–16 hrs at 150° F., 24 hrs. max.
AVOID air circulating tray ovens. Moisture levels in heated ambient air can exceed moisture level in the resin itself, causing moisture ABSORPTION not drying.
(2) Avoid melt temperature in excess of 560° F. and residence times over 6–8 minutes (may affect properties and/or appearance).
(3) Nozzle temperature controls assist in elimination of drool and premature freeze-off.
(4) Shot sizes in excess of 50% barrel capacity can lead to difficulties in providing a consistent, homogenous plastic melt.

The foregoing descriptions of materials, including preferred materials, will suggest numerous alternative materials to those skilled in the art. The battery of mechanical tests described above enable one skilled in the art to routinely screen such alternative materials. The representative adhesion test results provided for a variety of materials in Table IX further facilitate selection of alternative samples of materials.

TABLE IX

Concrete Adhesion Test Results

| Sample condition: Concrete previously poured and cured n times against sample | Force required to release sample from concrete | |
|---|---|---|
| | Preferred (typical force required) | Less preferred (typical force required) |
| n = 0–5 | 0–5 lbs e.g., Noryl ® PX0844 Noryl ® HS1000X Noryl ® GTX ® 909 polypropylene | 8–25 lbs e.g. urethane-coated aluminum, Emeralon RC-370 coated aluminum |
| n = 6–10 | 0–6 lbs e.g., Noryl ® PX1718 Noryl ® MX5314 Noryl ® HS1000X Noryl ® GTX ® 909 | — |

TABLE IX-continued

Concrete Adhesion Test Results

| n = 11–25 | 0–10 lbs e.g., Noryl ® PX0844 Noryl ® PX1718 Noryl ® GTX ® 909 | — |
|---|---|---|

Optionally, internal release agents may be added to resins to improve the ease with which a surface layer comprising the resin will release from cured concrete.

A concrete-facing surface layer is formed from any of the foregoing materials using techniques known in the art. Such techniques include various molding techniques, such as compression molding and injection molding, and more preferably extrusion techniques. A preferred concrete-facing surface layer (face sheet) is constructed from a modified PPE resin and has a thickness up to about ¼ inch, and preferably a thickness of about 1/16 inch. A preferred supplier of Noryl® face sheet materials of the present invention is General Electric Plastics.

To form the concrete form panel sheeting of the present invention, the core and concrete-facing surface layers are attached together using any procedure known in the art, including adhesives, solvent bonding techniques, ultrasonic welding, radio frequency welding, and the like. Less preferred methods include staples, fasteners, and the like. Where attachment is by means of an adhesive, the composition of the core and surface layers will dictate appropriate adhesives such as rubber-based or polystyrene-based adhesives. Similar considerations apply with respect to appropriate solvents for solvent bonding techniques.

In an embodiment wherein Azdel® (or other glass fiber-reinforced thermoplastic face sheets) are employed and are attached to the core by means of an adhesive, lofting of the Azdel® face sheet (heating of one side to allow the glass fibers to raise) according to the manufacturer's instructions may improve adhesion between the Azdel® and the adhesive.

In a preferred embodiment wherein both the core and concrete-facing surface layer are composed of modified PPE resins, techniques which form a unified, integral structure from the laminates are preferred. Such techniques include, for example, solvent bonding techniques and ultrasonic welding. For solvent bonding of such resins, a manufacturer's recommended solvent combination is 1:1 TCE (trichloroethylene, 1:1:2 trichloroethylene):MCB (monochlorobenzene, chlorobenzene). An alternative recommendation is 4:1 TCE:MBE mixed with 5–25% weight/vol. of NORYL® resin.

In a highly preferred method, an adhesive is applied to the core and/or the concrete-facing surface layer, which are then stacked upon each other. The stacked substrates are fed through rollers under high pressure, or pressed in a press, to create an integral unit from the parts. Preferably, the adhesive is a rubber-based adhesive (e.g., H.B. Fuller Product No. H.L. 2081) or a polystyrene-based or polystyrene-compatible hot melt adhesive which is sprayed upon the core and/or concrete facing surface layer with automatic spraying equipment. Pressure of 25,000–30,000 lbs./ft$^2$ is applied using rollers or a hydraulic press to create a mechanical and chemical bond. The bonded product is cured one to two hours at: about 125° F., while maintaining a relative humidity at or below 50%. A preferred finisher for adhering a GECET® foam core to a face sheet is Diversified Plastics Corporation (Nixa MO). It will be appreciated that, in an embodiment wherein the core and concrete-facing surface layer each comprise a polyphenylene ether/polystyrene blended resin, the use of a polystyrene-based adhesive results in an integral panel sheeting product that will not delaminate from exposure to water, form oil, concrete lime, and the like.

An adhesive should be selected which has a cure temperature that does not exceed the heat deflection temperature of the core or surface layer resin. Adhesives generally recommended by GE Plastics for Noryl® resins include methyl cyanoacrylate and ethyl cyanoacrylate adhesives (Permabond Intl. Co., Loctite Corp.); epoxy adhesives (Bacon Industries, 3M); silicone adhesives (GE); and acrylic adhesives (Lord Corp.; Lioctite).

A backside surface layer (C) optionally may be attached to the inventive concrete form panel sheeting, primarily for the purpose of imparting lateral strength to the panel sheeting to withstand the lateral force exerted on a concrete form by fresh (liquid) concrete (i.e., to impart increased resistance to deflection to the concrete form panel sheeting). Other means for imparting increased lateral strength to panel sheeting (e.g., increasing the thickness or density of the core; increasing the thickness of the concrete-facing surface layer) will be apparent. However, attaching a backside surface layer (backing sheet) is a preferred method for increasing the flexural strength of the panel sheeting, while minimizing the increase in mass of the sheeting.

The optional backside surface layer contacts wet concrete only incidentally (i.e., from splashing), and consequently releasability from cured concrete is of less importance for the backside surface layer than for the concrete-facing surface layer (B). Nonetheless, the backside surface layer preferably possesses the other desirable physical properties of the concrete-facing surface layer, including ease of penetration, scratch-resistance, impact resistance, chemical resistance, and ease of cleaning. Preferably, the backside surface layer comprises a material that is selected to maximize these properties while minimizing the weight and cost of the backside surface layer.

From the foregoing, it will be apparent that materials that make a useful concrete-facing surface layer also will make a useful backside surface layer. Thus, the backside surface layer may comprise a resinous polymer, particularly a thermoplastic resin as defined previously for the core (A) and concrete-facing surface layer (B). The backside surface layer also may comprise many additional strength-imparting materials known to those of ordinary skill, including a thin sheet of aluminum or other metal, or a fiber-reinforced resinous material. Preferred backside surface layers comprise a layer of material identical to the material used to form the concrete-facing surface layer, up to about ¼ thick, and a sheet of aluminum up to about 1/16" thick. The backside surface layer may be attached to the core by any known means, including means described above for attachment of the concrete-facing surface layer to the core. An aluminum backside surface layer preferably is attached to the core with an adhesive.

The potential recyclability of the concrete form panel sheeting of the present invention (e.g., after wear and tear make further use of such sheeting impractical) is an advantage over plywood panel sheeting of the prior art. Unlike plywood panel sheeting, the polymeric panel sheeting of the invention will absorb little or no external form release agent (e.g., form oil), if such release agents are used at all. Thus, after cleaning extraneous concrete and removing metal fasteners from the "spent" panel sheeting, a recyclable material exists.

EXAMPLE

Recycling panel sheeting made from compatible thermoplastic components

A batch of "spent" concrete forms comprising (A) a GECET® core and (B)+(C) one or more surface layers of a Noryl® that is a PPE/polystyrene blend, adhered to the core by means of a polystyrene adhesive, are cleaned of extraneous concrete and metal fasteners. The "spent" panel sheeting comprises essentially PPE, polystyrene, and minor additives, and may be recycled without separation of components. The cleaned panel sheeting is densified by means well known in the art (i.e., in a heating step). The densified material is ground up in a grinder and homogenized by passing it through an extruder. The extruded material is cut or ground into pellets and reformed into useful articles.

EXAMPLE

Recycling panel sheeting made from incompatible thermoplastic components

The "spent" concrete form panel sheeting comprises at least two materials that are chemically incompatible and cannot be recycled together. For example, the adhesive used to attach a GECET® core to a Noryl® surface layer comprises a chemical that cannot be recycled with modified PPE resins, or the backside surface layer comprises an aluminum sheeting that cannot be recycled with a thermoplastic core. The incompatible adhesive, metal, or other material is removed by means known in the art (e.g., with mechanical means, heat, solvents, floatation devices or the like). Recycling then proceeds as in the previous example.

Strength Test for Concrete Form Panel Sheeting

The following procedure is useful for measuring the resistance to deflection of concrete form panel sheeting under conditions designed to simulate the pressures to which such sheeting is subjected in concrete forming applications. Concrete form panel sheeting manufactured according to the teachings herein (e.g., a 2'×8'×½" panel) is inserted into a standard concrete form frame, such as a frame depicted in FIG. 3 or FIG. 9. The frame of the form is then securely locked down (immobilized).

An inflatable air bag having a surface 2'×8'in dimension is placed in contact with the concrete-facing surface of the concrete form. The air bag is inflated to impart a controlled pressure (e.g., 1.5–10.5 pounds per square inch or more) to the concrete facing surface, simulating the pressure of liquid concrete (10.5 PSI corresponds to about 1500 pounds/ft$^2$ of pressure).

Gauges attached to the back of the concrete form at selected locations (e.g., along the concrete form frame, and at the center of the panel, equally spaced between cross-supports and edge members of the concrete form frame) are used to measure deflection of the concrete form in response to the pressure. The air pressure is then released and the gauges are read to determine whether the deflection of the panel is permanent, or whether the panel regains its original shape.

To provide a baseline for evaluation of the panel, deflection measurements taken along the concrete form frame may be subtracted from measurements taken at the center of the panel. As a control, measurements are taken under identical conditions using an identical concrete form wherein HDO plywood is substituted for concrete form panel sheeting of the invention.

Modifications and variations may be apparent to one of ordinary skill from the foregoing description, which modifications are intended to come within the scope of the invention as defined in the appended claims.

What is claimed is:

1. A concrete form panel sheeting comprising:
   a resinous polymer core defining a concrete-form face and an opposite face, said concrete-form face and said opposite face defining edges of said concrete form panel sheeting;
   a concrete-facing surface layer attached to the concrete-form face of the core; and
   a stiffener sheet integral within said resinous polymer core, said stiffener sheet being oriented substantially parallel to said concrete form face and said opposite face, and substantially transverse to said edges.

2. A concrete form panel sheeting according to claim 1 wherein said stiffener sheet has a corrugated geometry.

3. The concrete form panel sheeting of claim 2 wherein said concrete-facing surface layer is contactable by fresh concrete and releasable from the concrete after curing thereof, to facilitate reuse of the concrete form panel sheeting.

4. The concrete form panel sheeting of claim 3 further comprising a backside surface layer attached to the opposite face of the core, said backside surface layer imparting resistance to deflection to the concrete form panel sheeting.

5. The concrete form panel sheeting of claim 4 wherein the core comprises a thermoplastic resin foam.

6. The concrete form panel sheeting of claim 5 wherein the core comprises a poly(phenylene ether) resin.

7. The concrete form panel sheeting of claim 5 wherein the core comprises a blend of a poly(phenylene ether) resin and an alkenyl aromatic polymer.

8. The concrete form panel sheeting of claim 7 wherein the alkenyl aromatic polymer is a member selected from the group consisting of polystyrenes and rubber modified polystyrenes.

9. The concrete form panel sheeting of claim 7 wherein the thermoplastic resin foam of the core has a density between 5 pounds per cubic foot and 15 pounds per cubic foot.

10. The concrete form panel sheeting of claim 7 wherein the thermoplastic foam of the core has a density between 6 pounds per cubic foot and 10 pounds per cubic foot.

11. The concrete form panel sheeting of claim 5 wherein said concrete-facing surface layer comprises a thermoplastic resin.

12. The concrete form panel sheeting of claim 5 wherein the concrete-facing surface layer comprises a material selected from the group consisting of poly(phenylene ether) resins, polystyrenes, polyesters, polyamides, polyolefins, acetal resins, acrylonitrile-butadiene-styrene (ABS) polymers, and polycarbonates.

13. The concrete form panel sheeting of claim 5 wherein the concrete-facing surface layer comprises a poly(phenylene ether) resin.

14. The concrete form panel sheeting of claim 5 wherein the concrete-facing surface layer comprises a material selected from the group consisting of flame-retardant poly(phenylene ether) resins, HIPS/poly(phenylene ether) blends, mineral-filled poly(phenylene ether) resins, and polyamide/poly(phenylene ether) blends.

15. The concrete form panel sheeting of claim 5 wherein the concrete-facing surface layer comprises a fiber-reinforced thermoplastic resin.

16. The concrete form panel sheeting of claim 5 wherein the concrete-facing surface layer comprises a glass fiber-reinforced polyolefin.

17. The concrete form panel sheeting of claim 16 wherein said polyolefin is polypropylene.

18. The concrete form panel sheeting of claim 5 wherein the backside surface layer comprises a material selected from the group consisting of poly(phenylene ether) resins, polystyrenes, polyesters, polyamides, polyolefins, acetal resins, acrylonitrile-butadiene-styrene (ABS) polymers, polycarbonates, fiber-reinforced thermoplastic resins, and metals.

19. The concrete form panel sheeting of claim 5 wherein said backside surface layer comprises a material selected from the group consisting of poly(phenylene ether) resins and fiber-reinforced polyolefins.

20. The concrete form panel sheeting of claim 5 wherein the backside surface layer comprises a metal.

21. The concrete form panel sheeting of claim 5 wherein the core has a thickness, defined by the concrete-form face and the opposite face, of 0.25 inches to 1.5 inches.

22. The concrete form panel sheeting of claim 21 wherein the concrete-facing surface layer has a thickness less than or equal to 0.25 inches.

23. The concrete form panel sheeting of claim 5 wherein the core and the concrete-facing surface layer are attached with an adhesive.

24. A reusable concrete form comprising a concrete form panel sheeting according to claim 5, and further comprising a concrete form frame attached to the concrete form panel sheeting.

25. The concrete form of claim 24, wherein the concrete form frame comprises structural means for interconnecting the concrete form with a second concrete form.

26. A concrete form network comprising:
   (a) a plurality of connected concrete form panel sheetings, wherein at least one of said concrete form panel sheetings comprises a concrete form panel sheeting according to claim 5; and
   (b) support means for maintaining the plurality of interconnected concrete form panel sheetings in a substantially fixed position when said panel sheetings are contacted by fresh concrete.

27. A concrete form panel sheeting according to claim 2 wherein said stiffener sheet and said resinous polymer core have substantially equal lengths and widths.

28. A concrete form panel sheeting according to claim 27, wherein said stiffener sheet has a plurality of holes.

29. A concrete form panel sheeting according to claim 2 wherein corrugations of said stiffener sheet having a corrugated geometry extend substantially entirely through the core from the concrete-form face to the opposite face.

30. A concrete form panel sheeting according to claim 29 wherein said stiffener sheet has a trapezoidal corrugated geometry.

31. A concrete form panel sheeting according to claim 2 wherein the resinous polymer core comprises a thermoplastic resin foam.

32. A concrete form panel sheeting according to claim 31 further comprising a backside surface layer attached to the opposite face of the core.

33. A concrete form panel sheeting according to claim 32 wherein said concrete-facing surface layer comprises a fiber-reinforced thermoplastic resin, and wherein said backside surface layer comprises a fiber-reinforced thermoplastic resin.

34. A concrete form panel sheeting according to claim 1 wherein said stiffener sheet comprises a material selected from the group consisting of metals, thermoplastic resins, thermoset resins, fiber-reinforced thermoplastic resins, and fiber-reinforced thermoset resins.

37

35. A concrete form panel sheeting according to claim 1 wherein said stiffener sheet comprises corrugated metal.

36. A reusable concrete form comprising:
  a concrete form panel sheeting comprising
    a thermoplastic foam core defining a concrete-form face and an opposite face, said concrete-form face and said opposite face defining edges;
    a stiffener sheet integral within said thermoplastic foam core and oriented substantially parallel to said faces and transverse to said edges; and
    a concrete-facing surface layer attached to the concrete-form face of the core, said concrete-facing surface layer being contactable by fresh concrete and releasable from the concrete after curing thereof, to facilitate reuse of the concrete form panel sheeting, and
  a concrete form frame attached to the concrete form panel sheeting.

37. The concrete form of claim 36 wherein the concrete-facing surface layer comprises a fiber-reinforced thermoplastic resin.

38. The concrete form of claim 36 wherein the concrete-facing surface layer comprises a glass fiber-reinforced polyolefin.

39. The concrete form of claim 36, wherein said concrete form panel sheeting further comprises a backside surface layer attached to the opposite face of the core, said backside surface layer imparting resistance to deflection to the concrete form panel sheeting.

40. A concrete form panel sheeting comprising:
  a resinous polymer panel defining a first major face and an opposite major face, said first major face and said opposite major face defining edges of said concrete form panel sheeting, said resinous polymer panel having a foam core; and
  a stiffener sheet integral within said foam core of said resinous polymer panel, said stiffener sheet being oriented substantially parallel to said first major face and said opposite major or face and substantially transverse to said edges.

38

41. The concrete form panel sheeting of claim 40, wherein the foam core of the panel comprises a thermoplastic resin foam.

42. The concrete form panel sheeting of claim 41, wherein the stiffener sheet comprises corrugated metal.

43. The concrete form panel sheeting according to claim 42, further comprising:
  a first face sheet attached to the first major face of the panel, said first face sheet comprising a thermoplastic resin.

44. The concrete form panel sheeting of claim 43, further comprising:
  an opposite face sheet attached to the opposite major face of the panel, said opposite face sheet comprising at least one of a thermoplastic resin and a metal.

45. A concrete form panel sheeting that is contactable by fresh concrete and releasable from the concrete after curing thereof, to facilitate reuse the concrete form panel sheeting, said concrete form panel sheeting having two substantially parallel major faces and further having edges defined by the major faces, said concrete form panel sheeting comprising:
  a resinous polymer core and a corrugated stiffener sheet that is integral within said resinous polymer core and substantially parallel with said major faces.

46. A concrete form panel sheeting according to claim 45 wherein said corrugated stiffener sheet and said resinous polymer core have substantially equal lengths and widths, and wherein said corrugated stiffener sheet has a plurality of holes.

47. A concrete form panel sheeting according to claim 46 wherein said corrugated stiffener sheet has a trapezoidal corrugated geometry.

48. A concrete form panel sheeting according to claim 47 wherein the resinous polymer Gore comprises a thermoplastic resin foam.

\* \* \* \* \*